United States Patent
Sekikawa et al.

(10) Patent No.: US 12,032,193 B2
(45) Date of Patent: Jul. 9, 2024

(54) OPTICAL ELEMENT AND METHOD FOR MANUFACTURING THE SAME

(71) Applicant: AGC Inc., Tokyo (JP)

(72) Inventors: Kenta Sekikawa, Fukushima (JP); Hiromichi Nagayama, Fukushima (JP); So Ishido, Fukushima (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/162,909

(22) Filed: Feb. 1, 2023

(65) Prior Publication Data

US 2023/0176270 A1 Jun. 8, 2023

Related U.S. Application Data

(63) Continuation of application No. PCT/JP2021/028752, filed on Aug. 3, 2021.

(30) Foreign Application Priority Data

Aug. 7, 2020 (JP) .................. 2020-135092

(51) Int. Cl.
*G02B 5/30* (2006.01)
*G02B 3/00* (2006.01)

(52) U.S. Cl.
CPC ......... *G02B 5/3091* (2013.01); *G02B 3/0018* (2013.01); *G02B 5/3016* (2013.01); *G02B 5/3041* (2013.01)

(58) Field of Classification Search
CPC ........... G02F 1/133362; G02F 1/13363; G02F 1/1337; G02F 1/133776; G02F 1/133711; G02B 5/3083; G02B 5/30; G02B 3/00
See application file for complete search history.

(56) References Cited

U.S. PATENT DOCUMENTS

| 2011/0310480 A1 | 12/2011 | Hoshi et al. |
| 2013/0016316 A1* | 1/2013 | Cheng .................. G02F 1/1337 427/510 |
| 2013/0016318 A1 | 1/2013 | Yamamoto et al. |

(Continued)

FOREIGN PATENT DOCUMENTS

| JP | 2005-516236 A | 6/2005 |
| JP | 2008-261282 A | 10/2008 |

(Continued)

OTHER PUBLICATIONS

Office Action dated Sep. 27, 2023, in related U.S. Appl. No. 18/162,783.

(Continued)

*Primary Examiner* — Mariam Qureshi
(74) *Attorney, Agent, or Firm* — Oblon, McClelland, Maier & Neustadt, L.L.P.

(57) ABSTRACT

An optical element includes a three-dimensional structure having a curved surface; and a retardation plate bent along the curved surface. The retardation plate includes a transparent substrate and a liquid crystal layer formed over the transparent substrate. The retardation plate has a slow axis and a fast axis. A glass-transition temperature, Tgne, in a slow axis direction of the retardation plate is higher than a glass-transition temperature, Tgno, in a fast axis direction of the retardation plate.

7 Claims, 14 Drawing Sheets

(56) References Cited

U.S. PATENT DOCUMENTS

| | | |
|---|---|---|
| 2013/0049255 A1 | 2/2013 | Matsumoto et al. |
| 2014/0237817 A1 | 8/2014 | Trajkovska-Broach et al. |
| 2015/0309370 A1 | 10/2015 | Park et al. |
| 2018/0164644 A1* | 6/2018 | Jiang ................ G02F 1/133788 |
| 2018/0201001 A1 | 7/2018 | Shibai et al. |
| 2020/0249475 A1 | 8/2020 | Amirsolaimani et al. |

FOREIGN PATENT DOCUMENTS

| | | |
|---|---|---|
| JP | 2009-98476 A | 5/2009 |
| JP | 2011-207221 A | 10/2011 |
| JP | 2012-3003 A | 1/2012 |
| JP | 2013-7781 A | 1/2013 |
| JP | 2013-61600 A | 4/2013 |
| JP | 2013-519108 A | 5/2013 |
| JP | 2014-6356 A | 1/2014 |
| JP | 2014-89346 A | 5/2014 |
| JP | 2016-509966 A | 4/2016 |
| JP | 5978761 B2 | 8/2016 |
| JP | 2016-200731 A | 12/2016 |
| JP | 2019-534484 A | 11/2019 |
| WO | WO 03/062872 A1 | 7/2003 |
| WO | WO 2011/094761 A2 | 8/2011 |
| WO | WO 2015/016685 A1 | 2/2015 |
| WO | WO 2018/093633 A1 | 5/2018 |

OTHER PUBLICATIONS

Yasuyuki Ohta, et al., "Surface Azimuthal Anchoring Energy between the Grating Surface and Nematic Liquid Crystal Layer Studied by Finite Element Method", Japanese Journal of Applied Physics, vol. 43, No. 7A, 2004 (3 pages).

Office Action mailed Feb. 12, 2024, in related U.S. Appl. No. 18/162,783, filed Feb. 1, 2023.

* cited by examiner

OPTICAL ELEMENT AND METHOD FOR MANUFACTURING THE SAME

CROSS-REFERENCE TO RELATED APPLICATION

The present application is a continuation application of International Application No. PCT/JP2021/028752, filed Aug. 3, 2021, which claims priority to Japanese Patent Application No. 2020-135092 filed Aug. 7, 2020. The contents of these applications are incorporated herein by reference in their entirety.

BACKGROUND OF THE INVENTION

1. Field of the Invention

The present disclosure relates to an optical element and a method for manufacturing the same.

2. Description of the Related Art

The polarizing plate for a curved surface described in Japanese unexamined patent application publication No. 2016-200731 includes a polarizer and a protective film laminated on the polarizer. The protective film has a retardation plate. The retardation plate is a stretched film and contains a polycarbonate (PC) resin as a main component. The polarizing plate for a curved surface is stuck to a curved surface of an adherend to obtain an optical laminate. The optical laminate is used as, for example, sunglasses or a lens of a camera.

Japanese translation of PCT international application publication No. JP-T-2013-519108 describes a lens including a linearly polarizing plate and a retardation plate. The retardation plate is, for example, a ¼ wavelength plate. The linearly polarizing plate and the ¼ wavelength plate constitute a circularly polarizing plate. The retardation plate is formed of a cycloolefin copolymer (COC) resin or the like. The retardation plate may be formed of a liquid crystal polymer instead of the COC resin.

The linearly polarizing plate and the retardation plate are separately subjected to a bending process at a high temperature and bonded to each other with an adhesive.

SUMMARY OF THE INVENTION

Problems to be Solved by the Invention

An optical element includes a three-dimensional structure and a retardation plate. The retardation plate includes a transparent substrate and a liquid crystal layer formed over the transparent substrate. Depending on the application of the optical element, from the viewpoint of its performance, the three-dimensional structure preferably has a curved surface.

There is a problem that when the retardation plate is bent so as to fit the curved surface of the optical element, the retardation of the retardation plate varies.

The present invention has been made in view of the above-described problem, and has an object to provide an optical element having a retardation plate bent along a curved surface of a three-dimensional structure, a variation in retardation of the retardation plate being suppressed, and a manufacturing method of the optical element.

Means for Solving the Problem

According to an aspect of the present disclosure, an optical element includes a three-dimensional structure having a curved surface; and a retardation plate bent along the curved surface. The retardation plate includes a transparent substrate and a liquid crystal layer formed over the transparent substrate. The retardation plate has a slow axis and a fast axis. A glass-transition temperature, $T_{gne}$, in a slow axis direction of the retardation plate is higher than a glass-transition temperature, $T_{gno}$, in a fast axis direction of the retardation plate.

Effects of the Invention

According to an aspect of the present disclosure, it is possible to reduce a variation in retardation of a retardation plate bent along a curved surface of a three-dimensional structure.

BRIEF DESCRIPTION OF DRAWINGS

Other objects and further features of the present disclosure will be apparent from the following detailed description when read in conjunction with the accompanying drawings, in which.

DESCRIPTION OF THE PREFERRED EMBODIMENT

Figure 1A:
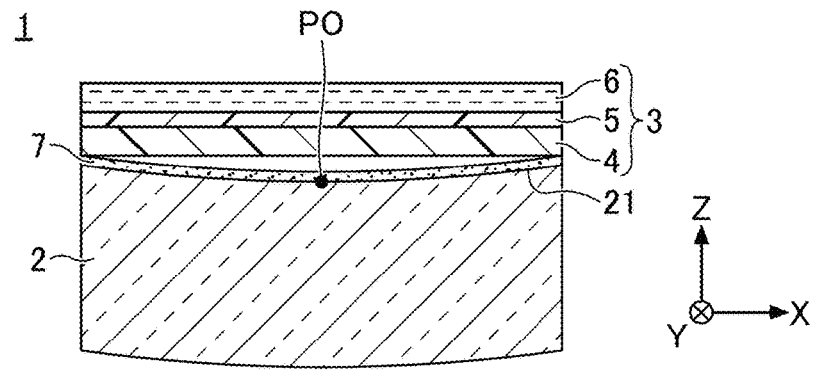
FIG. 1A is a cross-sectional view of an optical element showing a state before bonding a retardation plate and a three-dimensional structure according to a first embodiment.

Hereinafter, embodiments of the present disclosure will be described with reference to the drawings. In the drawings, the same or corresponding components are denoted by the same reference numeral, and description thereof may be omitted. In addition, in the specification, "-" indicating a numerical range means that numerical values described before and after "-" are included as a lower limit value and an upper limit value, respectively.

First Embodiment

An optical element 1 according to a first embodiment will be described with reference to FIGS. 1A to 1C. In the optical element 1, a three-dimensional structure 2 preferably has a curved surface 21 from a viewpoint of performance depending on an application of the optical element 1.

The optical element 1 includes the three-dimensional structure 2. The three-dimensional structure 2 may be a spherical lens or may be an aspherical lens. The three-dimensional structure 2 may be any one of a biconcave lens, a plano-concave lens, a concave meniscus lens, a biconvex lens, a plano-convex lens, and a convex meniscus lens.

The three-dimensional structure 2 has a curved surface 21. The curved surface 21 has a curvature radius of, for example, 10 mm-100 mm over the entire surface or a part thereof. The curvature radius of the curved surface 21 is preferably 20 mm-80 mm, and more preferably 50 mm-70 mm. The curved surface 21 is, for example, a concave surface as shown in FIGS. 1A and 1B. The concave surface is a curved surface in which a surface at a center of gravity P0 is concave from a periphery. In both the cross section perpendicular to the X-axis direction and the cross section perpendicular to the Y-axis direction, the center of gravity P0 of the concave surface is concave from the periphery of the concave surface. The X-axis direction, the Y-axis direction, and the Z-axis direction are perpendicular to each other. The Z-axis direction is a direction normal to the concave surface at the center of gravity P0. The XY plane is parallel to a tangential plane at the center of gravity P0 of the concave surface.

Figure 2A:
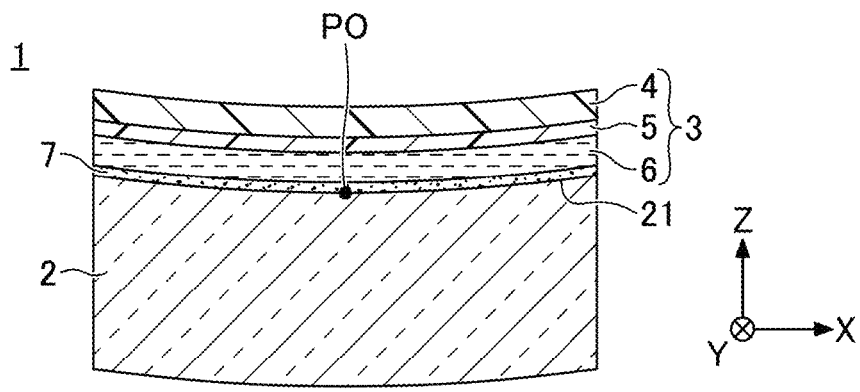
FIG. 2A is a cross-sectional view showing an optical element according to a first variation of the first embodiment.
Figure 2B:
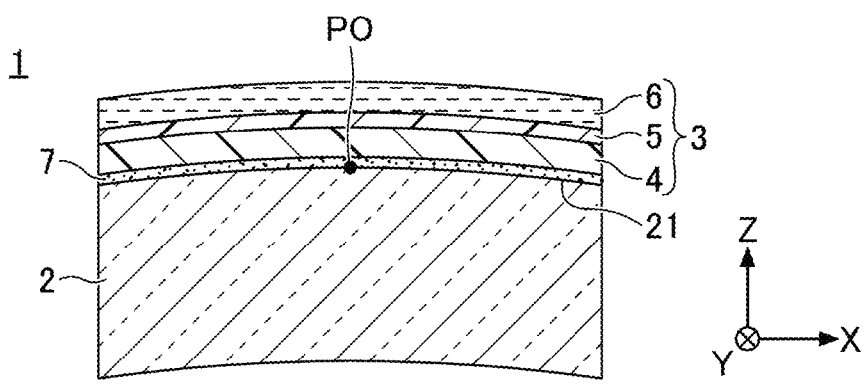
FIG. 2B is a cross-sectional view showing an optical element according to a second variation of the first embodiment.
Figure 2C:
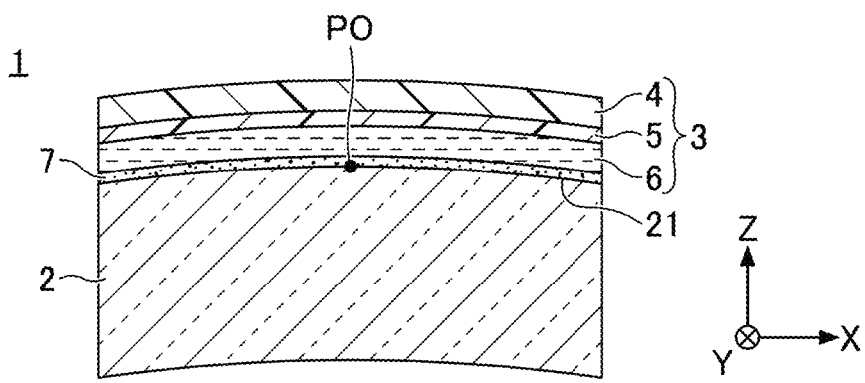
FIG. 2C is a cross-sectional view showing an optical element according to a third variation of the first embodiment.

In the present embodiment, the curved surface 21 is a concave surface. However, the present disclosure is not limited to this, and the curved surface may be a convex surface as shown in FIGS. 2B and 2C. The convex surface is a curved surface in which the surface at the center of gravity P0 is protruded from the periphery. In both the cross section perpendicular to the X-axis direction and the cross section perpendicular to the Y-axis direction, the center of gravity P0 of the convex surface is protruded from the periphery of the convex surface.

Figure 1B:
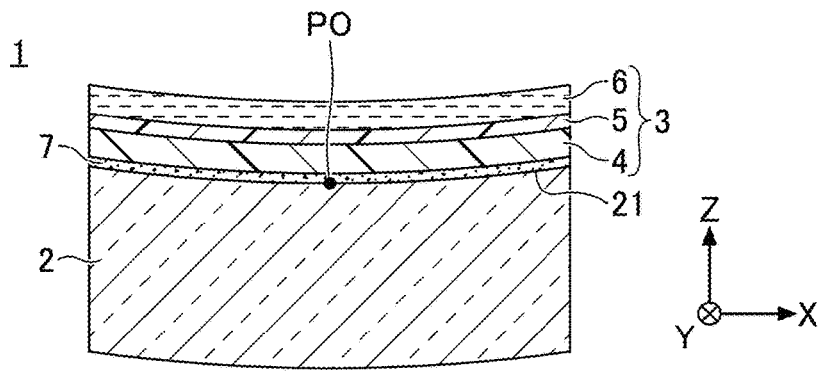
FIG. 1B is a cross-sectional view of the optical element in a state where the retardation plate and the three-dimensional structure shown in FIG. 1A are bonded.
Figure 1C:
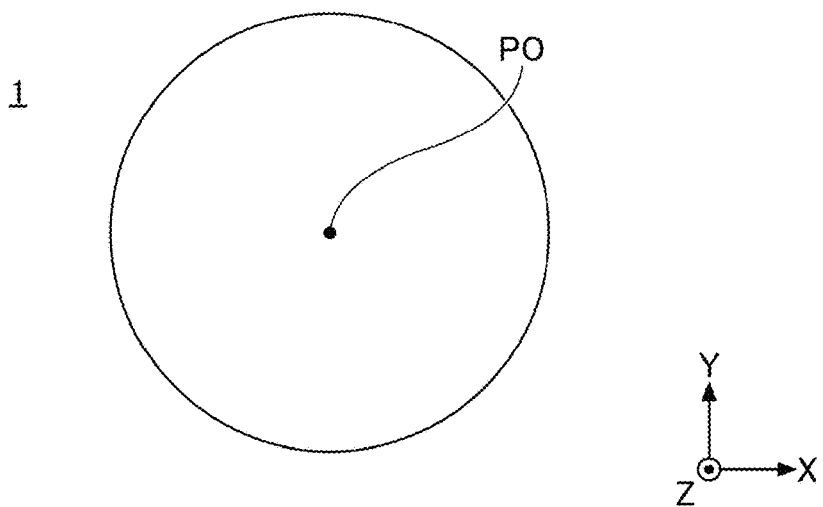
FIG. 1C is a plan view of the optical element shown in FIG. 1B.

The outer shape of the three-dimensional structure 2 is not limited to a circular shape illustrated in FIG. 1C, and may be, for example, an elliptical shape, or a polygonal shape (including a quadrangular shape).

The material of the three-dimensional structure 2 may be resin or may be glass. When the three-dimensional structure 2 is a resin lens, the resin of the resin lens is, for example, polycarbonate, polyimide, polyacrylate, or cyclic olefin. In the case where the three-dimensional structure is a glass lens, the glass of the glass lens is, for example, BK7 or synthetic quartz.

The optical element 1 includes a retardation plate 3. The retardation plate 3 is bent along the curved surface 21 of the three-dimensional structure 2. The retardation plate 3 includes, for example, a transparent substrate 4; an alignment layer 5 formed over the transparent substrate 4; and a liquid crystal layer 6 formed over the alignment layer 5. However, the alignment layer 5 may have any configuration, and may be omitted.

The retardation plate 3 has a slow axis and a fast axis. When viewed in the Z-axis direction, the slow axis is in the X-axis direction and the fast axis is in the Y-axis direction. The refractive index is the greatest in the slow axis direction, and the refractive index is the smallest in the fast axis direction.

The retardation plate 3 is, for example, a ¼ wavelength plate. The ¼ wavelength plate and a linearly polarizing plate (not illustrated) may be used in combination. The absorption axis of the linearly polarizing plate and the slow axis of the ¼ wavelength plate are arranged so as to be shifted from each other by 45°. The linearly polarizing plate and the ¼ wavelength plate constitute a circularly polarizing plate.

The linearly polarizing plate may be disposed on the side opposite to the three-dimensional structure 2 with respect to the retardation plate 3, may be disposed between the retardation plate 3 and the three-dimensional structure 2, or may be disposed on the side opposite to the retardation plate 3 with respect to the three-dimensional structure 2.

The retardation plate 3 includes, for example, the transparent substrate 4, the alignment layer 5, and the liquid crystal layer 6 in this order from the three-dimensional structure 2 side as shown in FIG. 1B. As shown in FIGS. 2A and 2C, the retardation plate 3 may include the liquid crystal layer 6, the alignment layer 5, and the transparent substrate 4 in this order from the three-dimensional structure 2 side.

The transparent substrate 4 is formed of, for example, a glass substrate or a resin substrate. The glass substrate or the resin substrate may be configured to have a reflection function or an absorption function with respect to any one or two or more of infrared light, visible light, and ultraviolet light, and transmit light in a specific wavelength band. The transparent substrate 4 may have a single-layer structure of a single substrate, or may have a multi-layer structure in which a film providing a reflection function or an absorption function to a main substrate (glass substrate or resin substrate) is laminated, and transmits light in a specific wavelength band. A film that provides an antifouling function or the like, in addition to the reflection function and the absorption function, may be laminated in the transparent substrate 4.

For example, the transparent substrate 4 may further include a resin film or an inorganic film in addition to the glass substrate or the resin substrate. The resin film is, for example, a film having a function of a color tone correction filter, a base film containing a silane coupling agent or the like, or an antifouling film. The resin film is formed by, for example, screen printing, vapor deposition, spray coating, or spin coating. The inorganic film is, for example, a metal oxide film having a function of an optical interference film (antireflection film or wavelength selection filter). The inorganic film is formed by, for example, a sputtering method, vapor deposition, or a CVD method.

The transparent substrate 4 is preferably a resin substrate from the viewpoint of bending processability. Specifically, the resins of the resin substrate include, for example, polymethyl methacrylate (PMMA), triacetylcellulose (TAC), cycloolefin polymer (COP), cycloolefin copolymer (COC), polyethylene terephthalate (PET), and polycarbonate (PC).

A retardation of the transparent substrate 4 is, for example, 5 nm or less, and preferably 3 nm or less. The retardation of the transparent substrate 4 is preferably as small as possible from the viewpoint of reducing variation in color tone, and may be zero. The retardation of the transparent substrate 4 is measured by, for example, a parallel Nicol rotation method.

The glass-transition temperature Tgf of the transparent substrate 4 is, for example, 80° C.-200° C., and preferably 90° C.-160° C. When the glass-transition temperature Tgf is within the above-described range, good bending processability is obtained. The glass-transition temperature of the transparent substrate 4 is measured by, for example, thermomechanical analysis (TMA).

The thickness T1 of the transparent substrate 4 (see FIG. 3A) is, for example, 0.01 mm-0.3 mm, preferably 0.02 mm-0.1 mm, and more preferably 0.03 mm-0.09 mm. When the thickness T1 is within the above-described range, both bending processability and handling property can be achieved. The thicknesses T1 of the transparent substrate 4 are measured at each point of the curved surface 21 of the three-dimensional structure 2 along the direction normal to the curved surface 21.

The alignment layer 5 aligns liquid crystal molecules of the liquid crystal layer 6. The alignment layer 5 is subjected to treatment such as rubbing of polyimide, photodecomposition of a silane coupling agent or polyimide by polarized UV irradiation, use of photodimerization or photoisomerization by polarized UV irradiation, use of a fine parallel groove structure, flow alignment treatment by shear force, or alignment treatment by oblique vapor deposition of an inorganic substance. A plurality of treatments may be used in combination. Among them, the use of photodimerization or photoisomerization by polarized UV irradiation or the use of a fine parallel groove structure is preferable from the viewpoint of alignment restricting force, applicability to curved surfaces, and reduction of foreign matter.

The materials for causing photodimerization by being irradiated with polarized UV light include, for example, coumarin, diphenylacetylene, and anthracene. The materials for causing photoisomerization by being irradiated with polarized UV light include, for example, azobenzene, stilbene, α-imino-β ketoester, and spiropyran. The materials for causing both photodimerization and photoisomerization by being irradiated with polarized UV light include, for example, cinnamate, chalcone, or stilbazole.

The transparent substrate 4 is coated with the alignment layer 5. The coating methods include, for example, spin coating, bar coating, dip coating, casting, spray coating, bead coating, wire bar coating, blade coating, roller coating, curtain coating, slit die coating, gravure coating, slit reverse coating, Micro Gravure™ coating, and comma coating. The resin composition is applied to the curved surface 21 of the three-dimensional structure 2 and dried. The solvent of the resin composition is removed by heating after coating. The coating method may be a vapor deposition method without using a solvent.

The thickness T2 of the alignment layer 5 (see FIG. 3A) is, for example, 1 nm-20 μm, preferably 50 nm-10 μm, and more preferably 100 nm-5 μm. The thickness T2 of the alignment layer 5 is measured in the direction normal to the surface of the transparent substrate 4, on which the alignment layer 5 is formed, at each point on the surface. When the alignment layer 5 has grooves 51, the thickness T2 of the alignment layer 5 in the present specification is a distance between a bottom of the grooves 51 and an upper surface of the transparent substrate 4.

Figure 3A:
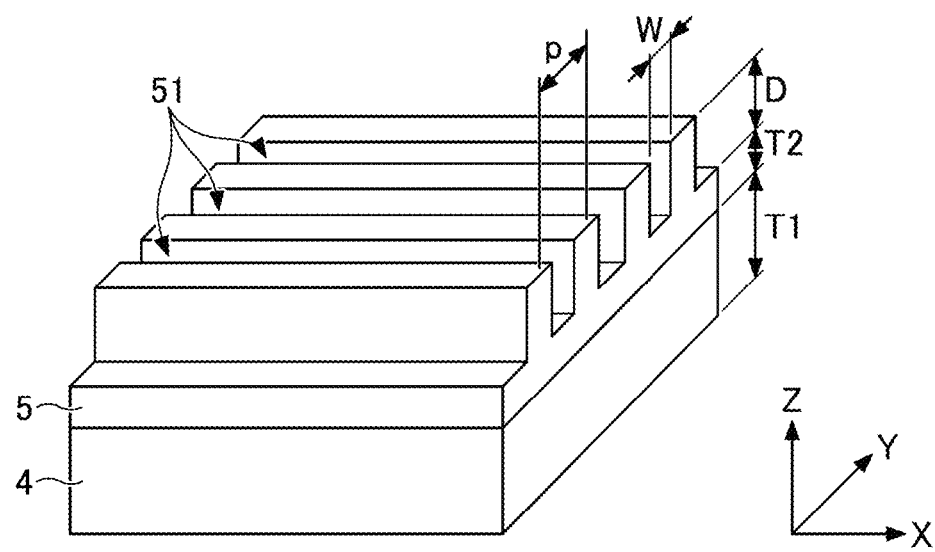
FIG. 3A is a perspective view showing an example of a transparent substrate and an alignment layer.

The alignment layer 5 may have a plurality of grooves 51 parallel to each other when viewed in the Z-axis direction on a surface in contact with the liquid crystal layer 6 (see FIG. 3A). The grooves 51 are formed by, for example, an imprint method after the resin composition is applied. The plurality of grooves 51 are formed in a stripe pattern, for example.

When viewed in the Z-axis direction, the longitudinal direction of the groove 51 is parallel to the X-axis direction, and the width direction of the groove 51 is parallel to the Y-axis direction. In the case of forming the groove 51 by the imprint method, the size and the shape of the groove 51 can be controlled with high accuracy and contamination by foreign matters can be reduced as compared with the case of forming the groove 51 by a rubbing method.

The depth D of the groove 51 is, for example, 5 nm-1000 nm, preferably 10 nm-300 nm, and more preferably 15 nm-150 nm. As the depth D of the groove 51 increases, the alignment restricting force of the liquid crystal molecules 61 in the liquid crystal layer 6 becomes greater. The depth D of the groove 51 may be constant or may vary as will be described later.

The opening width W of the groove 51 is, for example, 5 nm-800 nm, preferably 20 nm-300 nm, and more preferably 30 nm-150 nm.

The pitch p of the groove 51 is, for example, 10 nm-1000 nm, preferably 50 nm-500 nm, and more preferably 80 nm-300 nm. As the pitch p becomes smaller, the alignment restricting force of the liquid crystal molecules 61 in the liquid crystal layer 6 becomes greater and diffracted light is less likely to occur.

Figure 3B:
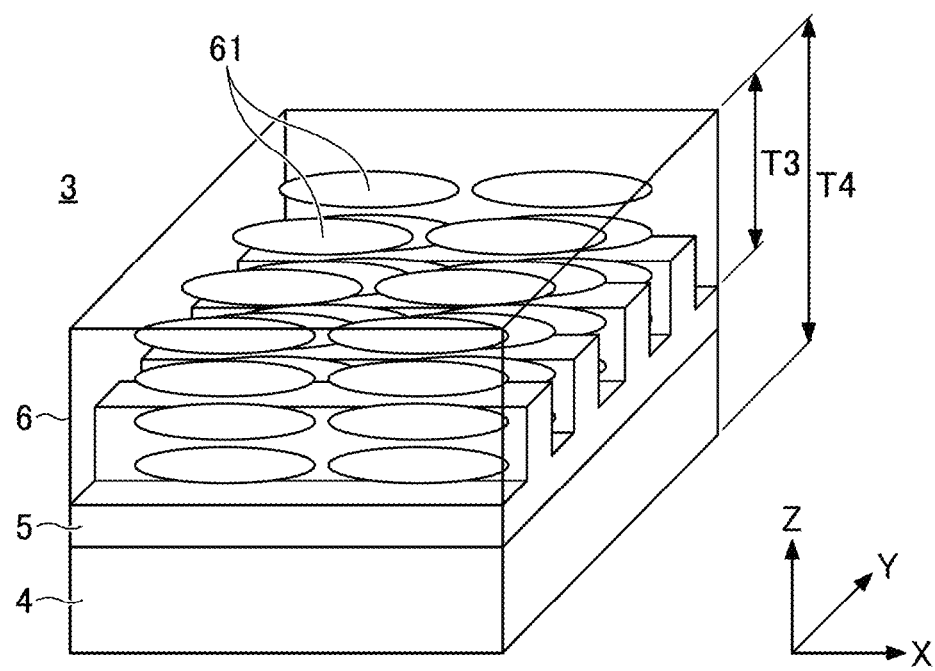
FIG. 3B is a perspective view showing an example of liquid crystal molecules aligned by the alignment layer shown in FIG. 3A.

A cross section perpendicular to the longitudinal direction (X-axis direction) of the groove 51 has a rectangular shape in FIGS. 3A and 3B, but may have a triangular shape. The width of the groove 51 increases as the depth decreases. In this case, the mold used in the imprint method can be easily peeled.

The materials forming the groove structure include, for example, an energy curable resin such as a photocurable resin or a thermosetting resin. In particular, a photocurable resin composition is preferably used from the viewpoint of excellent processability, heat resistance, and durability. The photocurable resin composition is a composition containing, for example, a monomer, a photopolymerization initiator, a solvent, and an additive (for example, a surfactant or a polymerization inhibitor) as necessary.

The glass-transition temperature Tg_al of the alignment layer 5 is, for example, 40° C.-200° C., preferably 50° C.-160° C., and more preferably 70° C.-150° C. When the glass-transition temperature Tg_al is within the above-described range, bending processability is good. The glass-transition temperature of the alignment layer 5 is measured by, for example, the TMA.

As described above, the alignment layer 5 may have any configuration and the alignment layer 5 may be omitted. In the case where the alignment layer 5 is absent, the transparent substrate 4 may be subjected to a treatment for aligning liquid crystal molecules of the liquid crystal layer 6. The treatment is, for example, an alignment treatment by rubbing of polyimide, photodecomposition of a silane coupling agent or polyimide by being irradiated with polarized UV light, photodimerization or photoisomerization by being irradiated with polarized UV light, flow alignment treatment by shear force, or oblique vapor deposition of an inorganic substance.

The liquid crystal layer 6 has a slow axis and a fast axis. The retardation Rd is a product of a difference $\Delta n$ between the refractive index ne of the slow axis and the refractive index no of the fast axis ($\Delta n = ne - no$) and a size d of the liquid crystal layer 6 in the Z-axis direction. That is, the retardation Rd is obtained from a relation $Rd = \Delta n \times d$.

As shown in FIG. 3B, the liquid crystal layer 6 includes a plurality of liquid crystal molecules 61 aligned in parallel to each other according to the alignment layer 5. When viewed in the Z-axis direction, the long-axis direction of the liquid crystal molecules 61 is parallel to the X-axis direction, and the short-axis direction of the liquid crystal molecules 61 is parallel to the Y-axis direction. The liquid crystal molecules 61 are rod-shaped liquid crystals in the present embodiment, but may be discotic liquid crystals.

The liquid crystal composition to be used may have a positive wavelength dispersion of the $\Delta n$ value after curing, and may have a negative wavelength dispersion.

The liquid crystal composition contains, for example, compounds represented by the following formulas (a-1) to (a-13) as a polymerizable compound.

[Chemical 1]

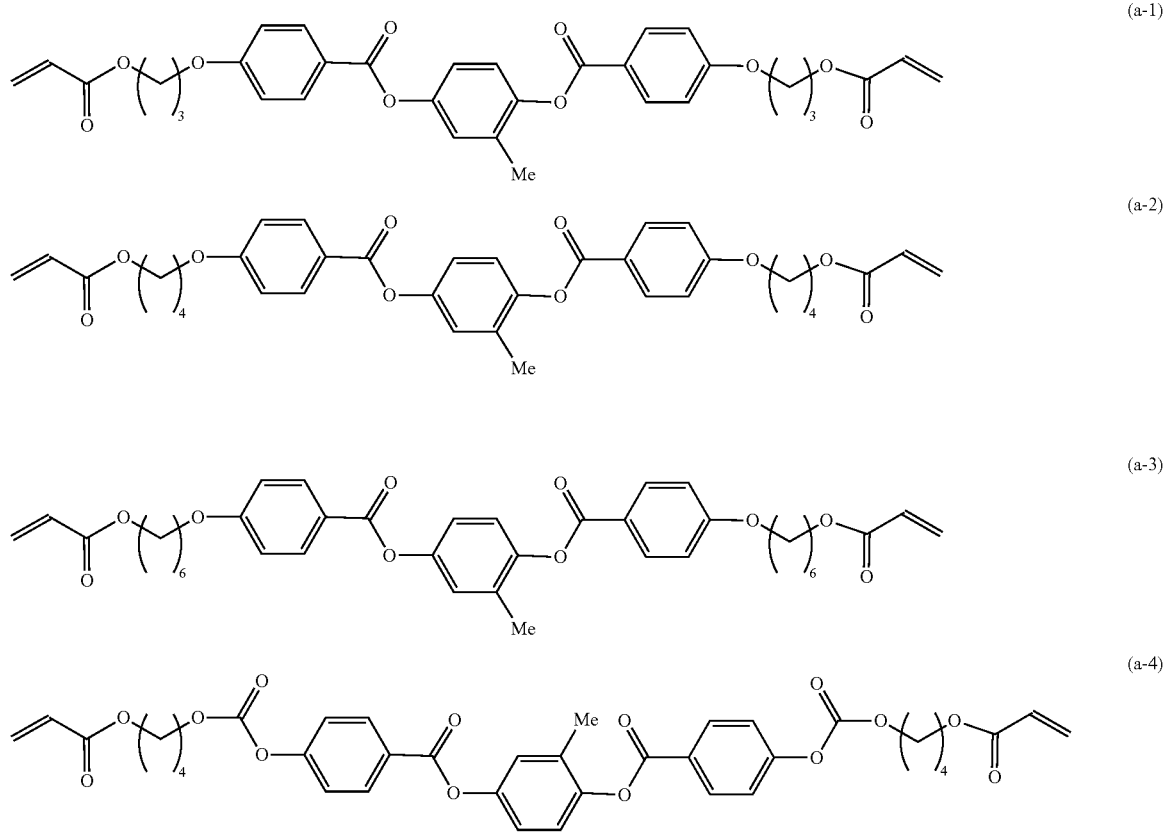

-continued

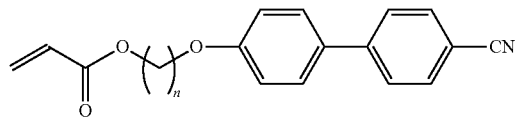
(a-5)

[Chemical 2]

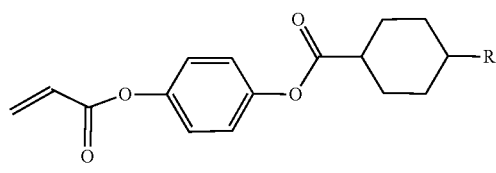
(a-6)
R = C$_3$H$_7$~C$_6$H$_{13}$

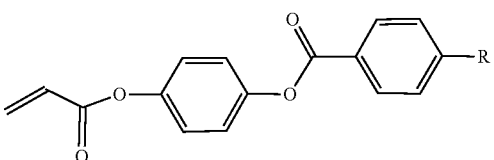
(a-7)
R = C$_3$H$_7$~C$_6$H$_{13}$

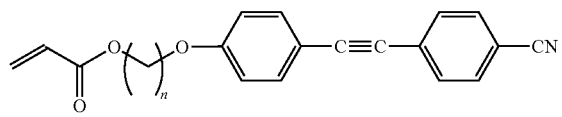
(a-8)

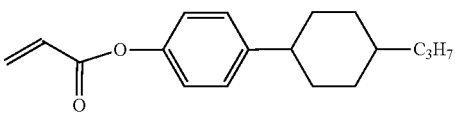
(a-9)

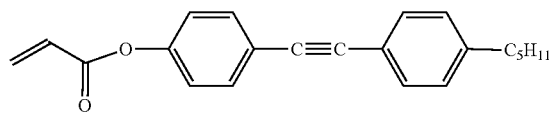
(a-10)

[Chemical 3]

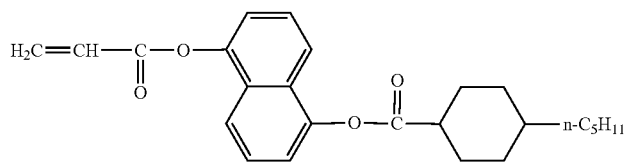
(a-11)

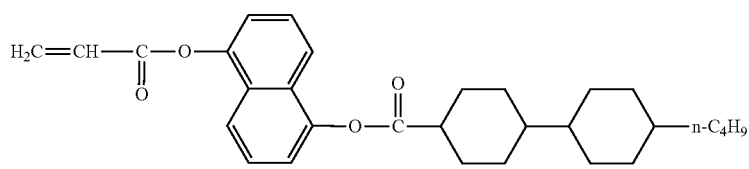
(a-12)

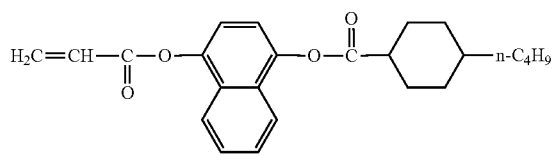
(a-13)

In the above formulas, (a-5) and (a-8), n is an integer of 2 to 6. In the above formulas (a-6) and (a-7), R is an alkyl group having 3 to 6 carbon atoms. In the above formulas (a-11), (a-12) and (a-13), n is an abbreviation for "normal", and means a linear group.

The liquid crystal layer 6 is formed by applying and drying a liquid crystal composition. The liquid crystal composition is, for example, a photo-curable polymer liquid crystal containing an acrylic group or a methacrylic group. The liquid crystal composition may contain a component that does not exhibit a liquid crystal phase by itself. It is sufficient that a liquid crystal phase is generated by polymerization. The components that do not exhibit a liquid crystal phase include, for example, monofunctional (meth) acrylate, bifunctional (meth) acrylate, and (meth) acrylate having three or more functional groups. The polymerizable liquid crystal composition may contain an additive. The additives include, for example, a polymerization initiator, a leveling agent, a chiral agent, a polymerization inhibitor, an ultraviolet absorber, an antioxidant, a light stabilizer, and a dichroic dye. A plurality of types of additives may be used in combination.

A known method may be used for applying the liquid crystal composition. The coating methods of the liquid crystal composition include, for example, a spin coating method, a bar coating method, an extrusion coating method, a direct gravure coating method, a reverse gravure coating method, and a die coating method. A solvent of the liquid crystal composition is removed by heating after coating.

The solvent of the liquid crystal composition is, for example, an organic solvent. The organic solvents include, for example, alcohols such as isopropyl alcohol; amides such as N,N-dimethylformamide; sulfoxides such as dimethyl sulfoxide; hydrocarbons such as benzene or hexane; esters such as methyl acetate, ethyl acetate, butyl acetate or propylene glycol monoethyl ether acetate; ketones such as acetone, cyclohexanone or methyl ethyl ketone; or ethers such as tetrahydrofuran or 1,2-dimethoxyethane. Two or more types of the organic solvents may be used in combination. The liquid crystal layer 6 may be formed by a vapor deposition method or a vacuum injection method without using a solvent.

The thickness T3 of the liquid crystal layer 6 (see FIG. 3B) is determined based on a wavelength of light, a retardation, and the difference Δn (Δn=ne−no). For example, when the wavelength of the light is 543 nm and the retardation is a ¼ wavelength, the retardation Rd is 136 nm. When the retardation Rd is 136 nm and the difference Δn is 0.1, the thickness T3 of the liquid crystal layer 6 is 1360 nm.

The thickness T3 of the liquid crystal layer 6 is determined based on the wavelengths of light, the retardation, and the difference Δn as described above. The thickness T3 is not particularly limited, and is, for example, 0.1 μm-20 μm, preferably 0.2 μm-10 μm, and more preferably 0.5 μm-5 μm. The liquid crystal layer 6 is not limited to a ¼ wavelength plate, and may be a ½ wavelength plate or the like.

The thickness T3 of the liquid crystal layer 6 is measured in the direction normal to the surface of the transparent substrate 4, on which the liquid crystal layer 6 is formed, at each point on the surface. When the alignment layer 5 has grooves 51, in the present specification, the thickness T3 of the liquid crystal layer 6 is a distance between the bottom of the grooves 51 and a surface of the liquid crystal layer 6 on the side opposite to the transparent substrate 4.

The glass-transition temperature Tg_a of the liquid crystal layer 6 is, for example, 50° C.-200° C., and preferably 80° C.-180° C. When the glass-transition temperature Tg_a is within the above-described range, bending processability is good. The glass-transition temperature Tg_a of the liquid crystal layer 6 is measured by, for example, the TMA.

The thickness T4 of the retardation plate 3 is not particularly limited. The thickness T4 is, for example, 0.011 mm-0.301 mm, preferably 0.021 mm-0.101 mm, and more preferably 0.031 mm-0.091 mm. The thicknesses T4 of the retardation plate 3 are measured in the direction normal to the surface of the transparent substrate 4, on which the liquid crystal layer 6 is formed, at each point.

The retardation plate 3 may be a wideband retardation plate further including a second liquid crystal layer (not shown) laminated on the liquid crystal layer 6. The number of the liquid crystal layers included in the wideband retardation plate may be two or more, and may be three or more. When viewed in the Z-axis direction, the plurality of liquid crystal layers have slow axes oriented in directions different from each other. In the case where the retardation plate 3 includes the plurality of liquid crystal layers, the retardation plate 3 may include a plurality of alignment layers or may have a structure that repeats a set of a liquid crystal layer and an alignment layer. The plurality of alignment layers may have the same material and may have materials different from each other.

The retardation of the retardation plate 3 is not particularly limited. In the case where the retardation plate 3 is a ¼ wavelength plate, the retardation is, for example, 100 nm-180 nm, preferably 110 nm-170 nm, and more preferably 120 nm-160 nm. When the retardation plate 3 is a ½ wavelength plate, the retardation is, for example, 200 nm-280 nm, preferably 210 nm-270 nm, and more preferably 220 nm-260 nm.

The wideband retardation plate is formed by, for example, alternately laminating the alignment layers 5 and the liquid crystal layers 6. The alignment layer 5 and the liquid crystal layer 6 are laminated in this order from the three-dimensional structure 2 side. Alternatively, the wideband retardation plate may be formed by bonding the liquid crystal layer formed over a transparent substrate different from the three-dimensional structure 2 and the liquid crystal layer formed over the three-dimensional structure 2 to each other.

The retardation plate 3 is bent and bonded to the three-dimensional structure 2. The bonding layer 7 is formed of, for example, optical clear adhesive (OCA), liquid adhesive (OSA), polyvinyl butyral (PVB), ethylene vinyl acetate (EVA), cyclo-olefin polymer (COP), or thermoplastic polyurethane (TPU).

The retardation of the bonding layer 7 is, for example, 5 nm or less, and preferably 3 nm or less. The retardation of the bonding layer 7 is preferably as small as possible from the viewpoint of reducing variation in color tone, and may be zero. The retardation of the bonding layer 7 is measured by, for example, a parallel Nicol rotation method.

The glass-transition temperature of the bonding layer 7 is, for example, −60° C.-+100° C., and preferably −40° C.-+50° C. When the glass-transition temperature of the bonding layer 7 is within the above-described range, both bending processability and shape followability can be achieved. The glass-transition temperature of the bonding layer 7 is measured by, for example, the TMA.

The thickness of the bonding layer 7 is, for example, 0.001 mm-0.1 mm, and preferably 0.005 mm-0.05 mm. When the thickness of the bonding layer 7 is within the above-described range, both bending processability and shape followability can be achieved. The thickness of the bonding layer 7 is measured in the direction normal to the curved surface 21 of the three-dimensional structure 2 at each point on the surface 21.

The retardation plate 3 and the three-dimensional structure 2 are bonded while being heated. The heating temperature is set based on the glass-transition temperature Tgf of the transparent substrate 4. The heating temperature is set within a range of, for example, Tgf−10° C. or more and Tgf+30° C. or less, and preferably within a range of Tgf−10° C. or more and Tgf+20° C. or less. The retardation plate 3 and the three-dimensional structure 2 may be bonded in a vacuum.

Alternatively, the three-dimensional structure 2 and the retardation plate 3 may be integrated by disposing the retardation plate 3 in a mold for injection molding, bending the retardation plate 3, and performing injection molding for the three-dimensional structure 2. In the case where the three-dimensional structure 2 and the retardation plate 3 are integrated by in-mold molding, the bonding layer 7 is unnecessary.

Figure 4A:
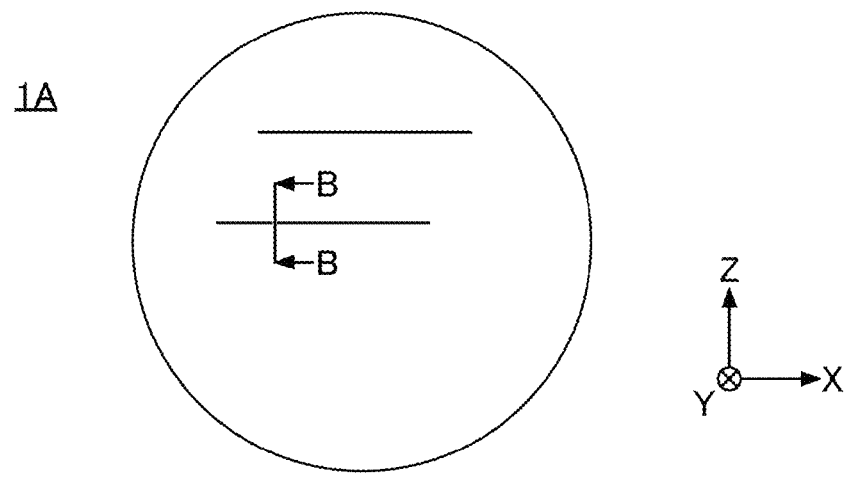
FIG. 4A is a plan view showing a buckling of a retardation plate of an optical element according to a first reference embodiment.
Figure 4B:
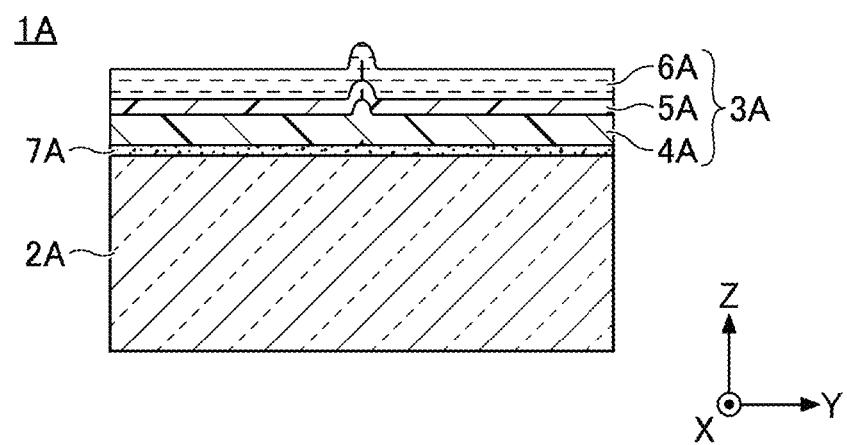
FIG. 4B is a cross-sectional view cut along a line B-B of FIG. 4A.

Next, buckling of a retardation plate of an optical element according to a first reference embodiment will be described with reference to FIGS. 4A and 4B. An optical element 1A according to the first reference embodiment includes a three-dimensional structure 2A and a retardation plate 3A. The retardation plate 3A includes a transparent substrate 4A, an alignment layer 5A, and a liquid crystal layer 6A. The three-dimensional structure 2A and the retardation plate 3A are bonded to each other via, for example, a bonding layer 7A.

Conventionally, in the process of bending the retardation plate 3A, because the hardness of the alignment layer 5A and the liquid crystal layer 6A is excessively higher than the hardness of the transparent substrate 4A and the extensibility of the alignment layer 5A and the liquid crystal layer 6A is lower than the extensibility of the transparent substrate 4A, the retardation plate 3A may be buckled. As a result, the liquid crystal layer 6A may be locally thickened, and the retardation Rd of the retardation plate 3A may locally change. Therefore, the color tone may locally change.

Therefore, in the optical element 1 of the present embodiment, a ratio Ene/Ef is 0.10 or more and 5.00 or less, and a ratio Eno/Ef is 0.10 or more and 5.00 or less, where Ef represents the Young's modulus of the transparent substrate 4, Ene represents the Young's modulus of the retardation plate 3 in the slow axis direction, and Eno represents the Young's modulus of the retardation plate 3 in the fast axis direction. Ef, Ene, and Eno represent the Young's moduli when the temperature of the transparent substrate 4 and the retardation plate 3 is the glass-transition temperature Tgf of the transparent substrate 4. Ef, Ene, and Eno are measured by the TMA.

When the retardation plate 3 is subjected to the bending process, the retardation plate 3 is heated to the temperature of Tgf−10° C. or more and Tgf+30° C. or less, as described above. When the ratios Ene/Ef and Eno/Ef are 5.00 or less, the hardness of the alignment layer 5 and the liquid crystal layer 6 is low enough for bending the retardation plate 3, and excellent extensibility of the alignment layer 5 and the liquid crystal layer 6 is obtained to the same extent as the extensibility of the transparent substrate 4. Thus, buckling of the retardation plate 3 can be suppressed, a local change in the retardation Rd can be suppressed, and a local change in color tone can be suppressed. On the other hand, when the ratios Ene/Ef and Eno/Ef are 0.10 or more, the alignment layer 5 and the liquid crystal layer 6 are appropriately hard during the bending process for the retardation plate 3. Therefore, it is possible to suppress a flow of the alignment layer 5 and the liquid crystal layer 6 due to gravity and suppress a flow of them due to an air flow during molding. The ratios Ene/Ef and Eno/Ef are preferably 0.50 or more and 4.00 or less, and more preferably 0.70 or more and 3.00 or less.

Second Embodiment

Next, an optical element 1 according to a second embodiment will be described. A diagram depicting the configuration of the optical element 1 according to the second embodiment is the same as that shown in FIGS. 1A to 1C depicting the configuration of the optical element 1 of the first embodiment. Thus, depicting the configuration of the optical element 1 according to the second embodiment will be omitted. Hereinafter, differences from the first embodiment will be mainly described. Techniques illustrated in the present embodiment may be combined with the techniques illustrated in the first embodiment.

Figure 5A:
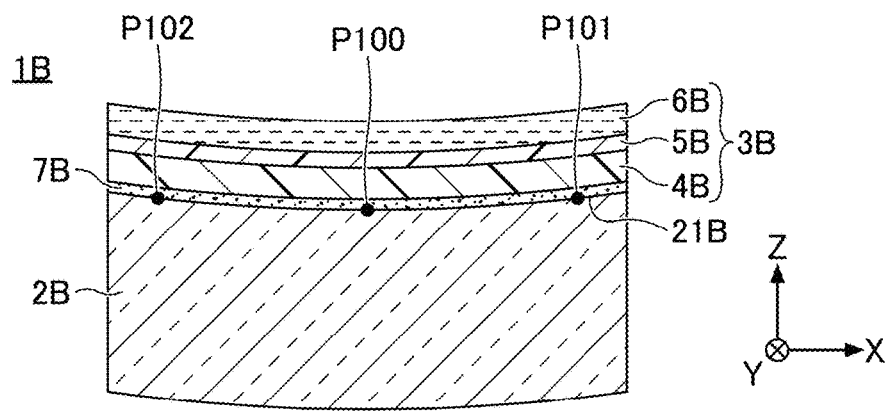
FIG. 5A is a cross-sectional view of an optical element according to a second reference embodiment cut along a plane perpendicular to the Y-axis direction.
Figure 5B:
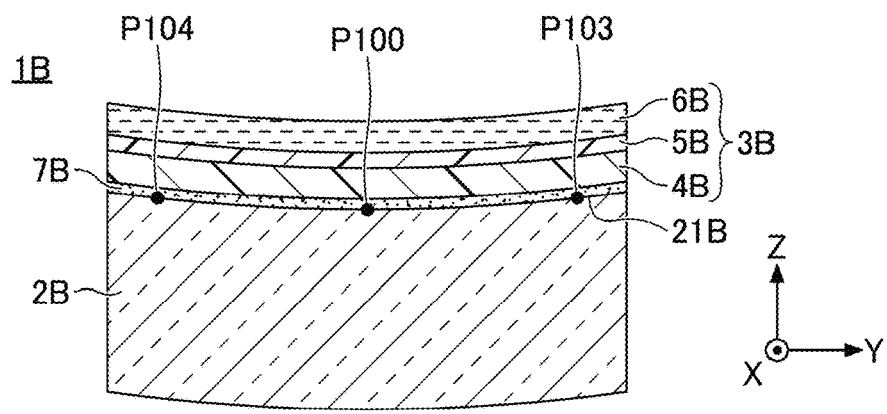
FIG. 5B is a cross-sectional view of the optical element in FIG. 5A cut along a plane perpendicular to the X-axis direction.

First, an optical element 1B according to a second reference embodiment will be described mainly with reference to FIGS. 5A to 5C. As shown in FIGS. 5A and 5B, the optical element 1B includes a three-dimensional structure 2B and a retardation plate 3B. The retardation plate 3B includes a transparent substrate 4B, an alignment layer 5B, and a liquid crystal layer 6B. The three-dimensional structure 2B and the retardation plate 3B are bonded to each other via, for example, a bonding layer 7B.

The liquid crystal layer 6B includes a plurality of liquid crystal molecules 61 parallel to each other (see FIG. 3B). When viewed in the Z-axis direction, the long-axis direction of the liquid crystal molecules 61 is parallel to the X-axis direction, and the short-axis direction of the liquid crystal molecules 61 is parallel to the Y-axis direction.

The inventors of the present invention have found, by experiments and the like, a problem that when the liquid crystal layer 6B having a uniform thickness is formed over a curved surface 21B of the three-dimensional structure 2B, the variation in the retardation Rd of the liquid crystal layer 6B becomes large.

The cause of the above-described problem, i.e. the large variation in the case where the liquid crystal layer 6B has a uniform thickness will be described. As shown in FIGS. 5A and 5B, the liquid crystal layer 6B is formed over the curved surface 21B of the three-dimensional structure 2B. As a result, the liquid crystal molecule 61 is inclined with respect to the XY plane at a position separated from the center of gravity P100 of the curved surface 21B.

Figure 5C:
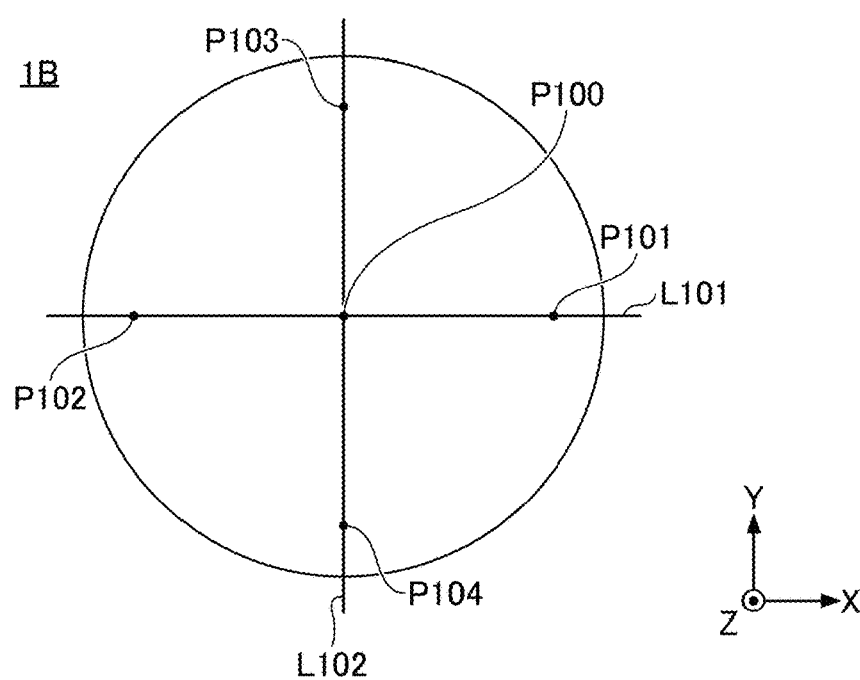
FIG. 5C is a plan view of the optical element shown in FIG. 5A.

The inclination of the liquid crystal molecules 61 at points P101 and P102 on a first virtual line L101 is different from the inclination of the liquid crystal molecules 61 at points P103 and P104 on a second virtual line L102, as shown in FIG. 5C. When viewed in the Z-axis direction, the first virtual line L101 is a virtual line that passes through the center of gravity P100 and is parallel to the slow axes. In addition, when viewed in the Z-axis direction, the second virtual line L102 is a virtual line that passes through the center of gravity P100 and is parallel to the fast axis.

Figure 6A:
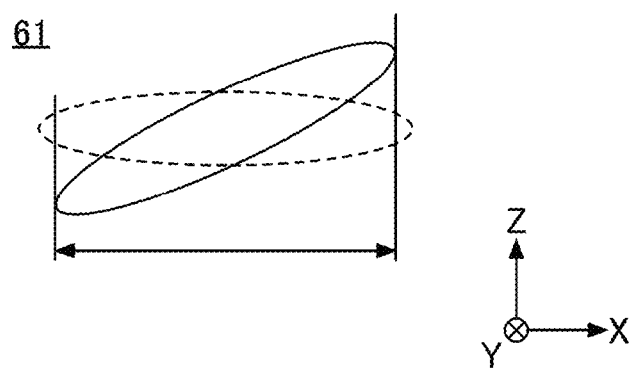
FIG. 6A is a diagram depicting a liquid crystal molecule at a point P101 in FIGS. 5A and 5C when viewed from the Y-axis direction.
Figure 6B:
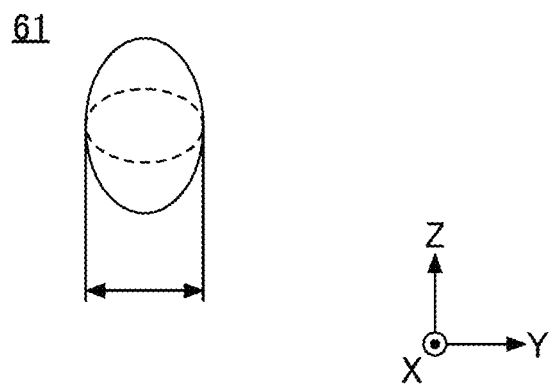
FIG. 6B is a diagram depicting the liquid crystal molecule at the point P101 in FIGS. 5A and 5C when viewed from the X-axis direction.

FIGS. 6A and 6B show the inclination of the liquid crystal molecule 61 at the point P101 on the first virtual line L101. In FIGS. 6A and 6B, the broken line indicates the liquid crystal molecule 61 at the center of gravity P100, and the solid line indicates the liquid crystal molecule 61 at the point P101. As is apparent from FIGS. 6A and 6B, at the point P101, the size of the liquid crystal molecule 61 in the X-axis direction is smaller than that at the center of gravity P100, but the size of the liquid crystal molecule 61 in the Y-axis direction remains unchanged. The same applies to the point P102.

As a result, at the points P101 and P102 on the first virtual line L101, the refractive index of the slow axis ne becomes smaller than that at the center of gravity P100, whereas the refractive index of the fast axis no remains unchanged, so that the difference Δn becomes smaller. Further, at the points P101 and P102, the size of the liquid crystal layer in the Z-axis direction d is greater than that at the center of gravity P100. A decrease in the retardation Rd due to the decrease in Δn is greater than an increase in Rd due to the increase in d. As a result, at the points P101 and P102, Rd which is the product of Δn and d is smaller than that at the center of gravity P100.

Figure 7A:
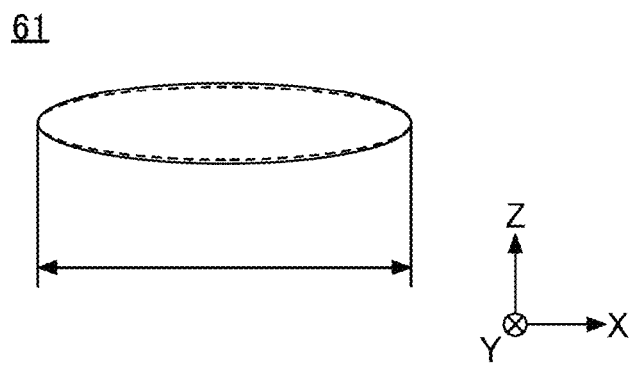
FIG. 7A is a diagram depicting a liquid crystal molecule at a point P103 in FIGS. 5B and 5C when viewed from the Y-axis direction.
Figure 7B:
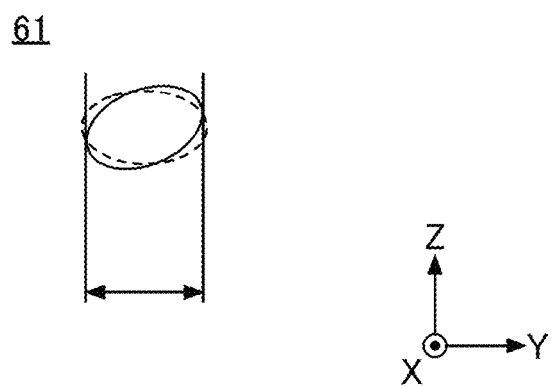
FIG. 7B is a diagram depicting the liquid crystal molecule at the point P103 in FIGS. 5B and 5C when viewed from the X-axis direction.

FIGS. 7A and 7B show the inclination of the liquid crystal molecule 61 at the point P103 on the second virtual line L102. In FIGS. 7A and 7B, the broken line indicates the liquid crystal molecule 61 at the center of gravity P100, and the solid line indicates the liquid crystal molecule 61 at the point P103. As is apparent from FIGS. 7A and 7B, at the point P103, the size of the liquid crystal molecule 61 in the Y-axis direction is slightly smaller than that at the center of gravity P100, but the size of the liquid crystal molecule 61 in the X-axis direction remains unchanged. The same applies to the point P104.

As a result, at the points P103 and P104 on the second virtual line L102, no becomes smaller than that at the center of gravity P100, and ne remains unchanged, so that Δn becomes greater. Further, at the points P103 and P104, d is greater than that at the center of gravity P100. Therefore, the retardation Rd at the points P103 and P104 is greater than that at the center of gravity P100.

Figure 8:
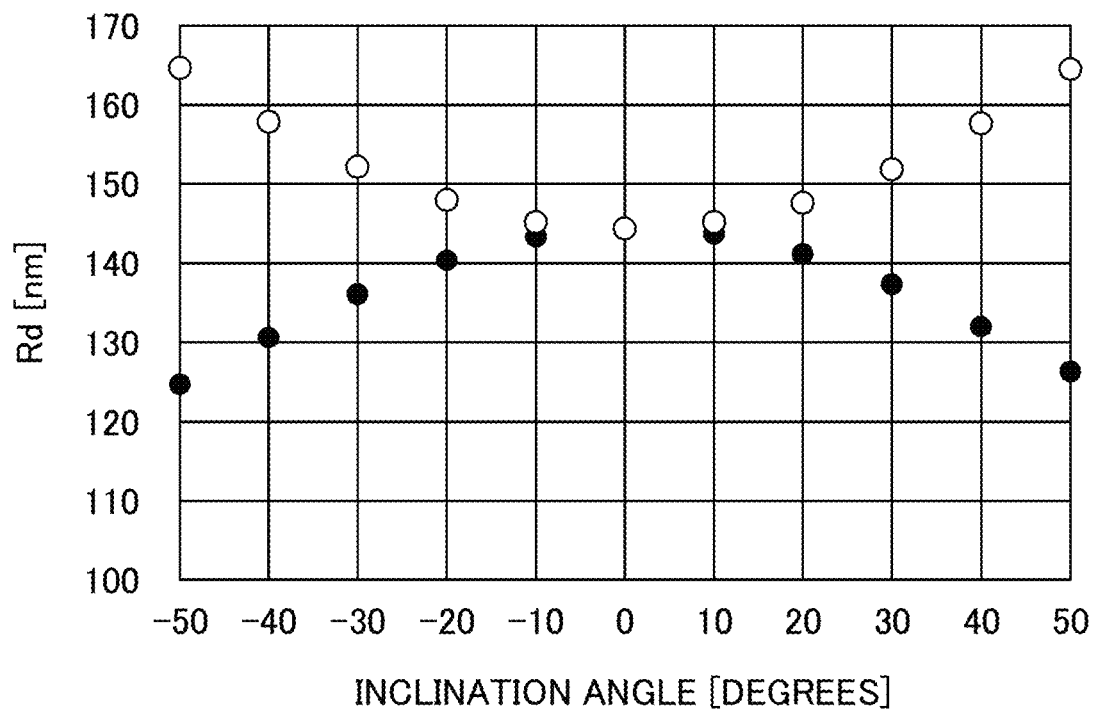
FIG. 8 is a diagram showing an example of a relationship between an inclination angle of a liquid crystal layer in a flat plate shape and a retardation Rd.

FIG. 8 is a diagram showing an example of a relationship between an inclination angle of the flat liquid crystal layer and a measured value of the retardation Rd. In FIG. 8, the inclination angle of 0° means that the planar liquid crystal layer is aligned parallel to the XY plane.

Black circles in FIG. 8 are obtained by inclining the flat liquid crystal layer rotating clockwise and counterclockwise around the second virtual line L102. A positive inclination angle indicates that the rotation direction is clockwise, and a negative inclination angle indicates that the rotation direction is counterclockwise.

An absolute value of the inclination angle for each black circle (horizontal axis in FIG. 8) corresponds to a distance between the point P101 or P102 on the first virtual line L101 and the center of gravity P100. As the distance between the point P101 or P102 and the center of gravity P100 increases, the absolute value of the inclination angle of the liquid crystal molecule 61 increases and the retardation Rd decreases.

On the other hand, white circles in FIG. 8 are obtained by inclining the flat liquid crystal layer rotating clockwise and counterclockwise around the first virtual line L101. A positive inclination angle indicates that the rotation direction is clockwise, and a negative inclination angle indicates that the rotation direction is counterclockwise.

An absolute value of the inclination angle for each white circle (horizontal axis in FIG. 8) corresponds to a distance between the point P103 or P104 on the second virtual line L102 and the center of gravity P100. As the distances between the point P103 or P104 and the center of gravity P100 increase, the absolute value of the inclination angle of the liquid crystal molecule 61 increases, and the retardation Rd increases.

As is apparent from the comparison between the black circles and the white circles in FIG. 8, the tendency of change in the retardation Rd on the first virtual line L101 is different from the tendency of change in the retardation Rd on the second virtual line L102. On the first virtual line L101, the retardation Rd decreases as the distance from the center of gravity P100 increases. On the other hand, on the second virtual line L102, the retardation Rd increases as the distance from the center of gravity P100 increases.

Although the curved surface 21B of the three-dimensional structure 2B is a concave surface in the present reference embodiment, the curved surface 21B may be a convex surface. The absolute value of the inclination angle of the liquid crystal molecule 61 for the convex surface is substantially the same as that for the concave surface. Therefore, the distribution of the retardation Rd for the convex surface is substantially the same as that for the concave surface.

Conventionally, the difference in the retardation Rd between the point P101 or P102 on the first virtual line L101 and the point P103 or P104 on the second virtual line L102 is large. Such tendency can be clearly seen from the comparison of the black circles with the white circles in FIG. 8.

In the present embodiment, the thicknesses of the liquid crystal layer 6 at the points P103 and P104 on the second virtual line L102 are made smaller than the thicknesses of the liquid crystal layer 6 at the points P101 and P102 on the first virtual line L101 in order to make the white circles closer to the black circles in FIG. 8.

The distribution of the thickness of the liquid crystal layer 6 is controlled by, for example, anisotropy of extension of the retardation plate 3 in the bending process. The anisotropy of extension of the retardation plate 3 in the bending process can be controlled by a difference between Tgne and Tgno. Tgne is the glass-transition temperature of the retardation plate 3 in the X-axis direction (slow axis direction), and Tgno is the glass-transition temperature of the retardation plate 3 in the Y-axis direction (fast axis direction).

In the optical element 1 according to the present embodiment, the temperature Tgne is higher than the temperature Tgno. In the process of bending the retardation plate 3, the retardation plate 3 is heated to a temperature of Tgf−10° C. or more and Tgf+30° C. or less.

When the temperature Tgne is higher than the temperature Tgno, the extension of the retardation plate 3 in the Y-axis direction is greater than the extension of the retardation plate 3 in the X-axis direction in the process of bending the retardation plate 3. As a result, the distribution of the thickness of the liquid crystal layer 6 is optimized, and the difference in the retardation Rd is reduced.

The temperature Tgne is, for example, 90° C. or more and 250° C. or less, preferably 120° C. or more and 180° C. or less, and more preferably 130° C. or more and 160° C. or less. On the other hand, the temperature Tgno is, for example, 50° C. or more and 180° C. or less, preferably 80° C. or more and 160° C. or less, and more preferably 90° C. or more and 150° C. or less.

Figure 9:
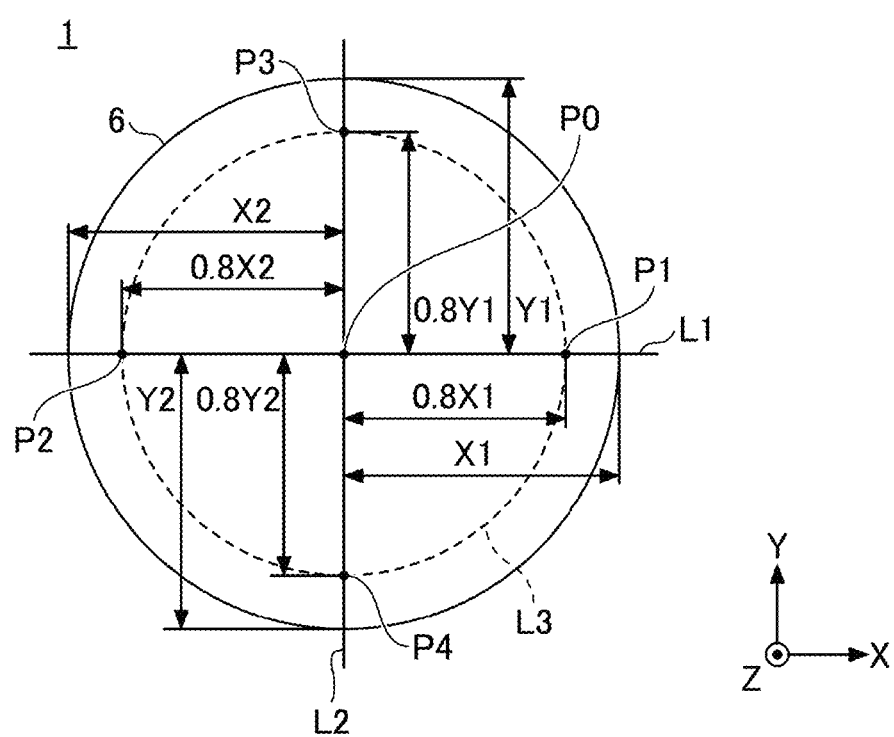
FIG. 9 is a plan view of an optical element according to a second embodiment.

Next, the distribution of the thickness of the liquid crystal layer 6 according to the present embodiment will be described with reference to FIG. 9. In FIG. 9, the first virtual line L1 is a virtual line that passes through the center of gravity P0 and is parallel to the slow axes when viewed in the Z-axis direction. In addition, when viewed in the Z-axis direction, the second virtual line L2 is a virtual line that passes through the center of gravity P0 and is parallel to the fast axis.

When viewed in the Z-axis direction, a division line L3 divides each line segment connecting the center of gravity P0 and a point on the periphery of the curved surface 21 at a ratio of 4:1 from the center of gravity P0 side toward the periphery of the curved surface 21. When viewed in the Z-axis direction, the first virtual line L1 and the division line L3 intersect each other at the first point P1 and at the second point P2, and the second virtual line L2 and the division line L3 intersect each other at the third point P3 and at the fourth point P4.

The distance between the first point P1 and the center of gravity P0 is 0.8 times X1. The distance X1 is a distance between the center of gravity P0 and an intersection of a straight line from the center of gravity P0 extending in the positive X-axis direction and the periphery of the curved surface 21. The distance between the second point P2 and the center of gravity P0 is 0.8 times X2. The distance X2 is a distance between the center of gravity P0 and an intersection of a straight line from the center of gravity P0 extending in the negative X-axis direction and the periphery of the curved surface 21.

The distance between the third point P3 and the center of gravity P0 is 0.8 times Y1. The distance Y1 is a distance between the center of gravity P0 and an intersection of a straight line from the center of gravity P0 extending in the positive Y-axis direction and the periphery of the curved surface 21. The distance between the fourth point P4 and the center of gravity P0 is 0.8 times Y2. The distance Y2 is a distance between the center of gravity P0 and an intersection of a straight line from the center of gravity P0 extending in the negative Y-axis direction and the periphery of the curved surface 21.

According to the present embodiment, a sum of thicknesses ty1 and ty2 of the liquid crystal layer 6 at the third point P3 and the fourth point P4, respectively, on the second virtual line L2 shown in FIG. 9 is smaller than a sum of thicknesses tx1 and tx2 of the liquid crystal layer 6 at the first point P1 and the second point P2, respectively, on the first virtual line L1. That is, formula (1), shown below, is satisfied.

[Equation 1]

$$ty1+ty2<tx1+tx2 \quad (1)$$

When the above formula (1) is satisfied, the difference in the retardation Rd at a position separated from the center of gravity P0 (the difference between the black circle and the white circle in FIG. 8) can be reduced. This is because the thicknesses of the liquid crystal layer 6 can be made different so as to reduce the difference in the retardation Rd. Therefore, unevenness in color tone can be suppressed.

The thickness of the liquid crystal layer 6 is measured in the direction normal to the curved surface 21 of the three-dimensional structure 2 at each point of the curved surface 21. The thickness of the liquid crystal layer 6 is calculated from, for example, spectral interference or a photograph captured by using a scanning electron microscope (SEM).

In addition to the above formula (1), the following formula (2) is preferably satisfied.

[Equation 2]

$$0.75 < \frac{ty1+ty2}{tx1+tx2} < 1.00 \quad (2)$$

When the above formula (2) is satisfied, the unevenness in the retardation Rd of the liquid crystal layer 6 is further reduced compared to the case where only the above formula (1) is satisfied. Therefore, the unevenness in color tone can be further suppressed. The ratio (ty1+ty2)/(tx1+tx2) is preferably greater than 0.80, and more preferably greater than 0.85. Further, the ratio (ty1+ty2)/(tx1+tx2) is preferably smaller than 0.99, and more preferably smaller than 0.98.

In the present embodiment, the distribution of the thickness of the liquid crystal layer 6 is controlled by the anisotropy of extension of the retardation plate 3 in the bending process. However, the present invention is not limited to this. The distribution of the thickness of the liquid crystal layer 6 may be controlled by using a dry etching method. As the dry etching method, for example, a plasma etching method is used.

Figure 10A:
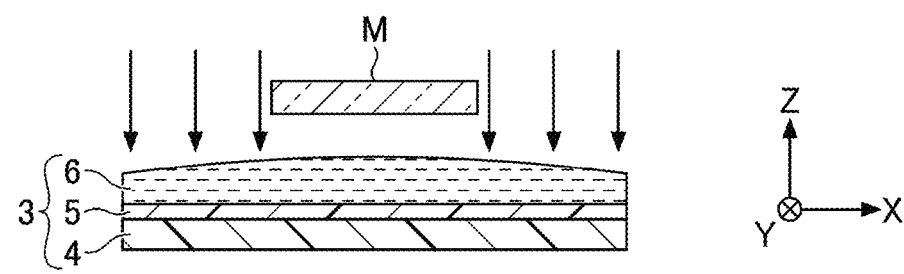
FIG. 10A is a cross-sectional view showing an example of performing dry etching for an optical element.
Figure 10B:
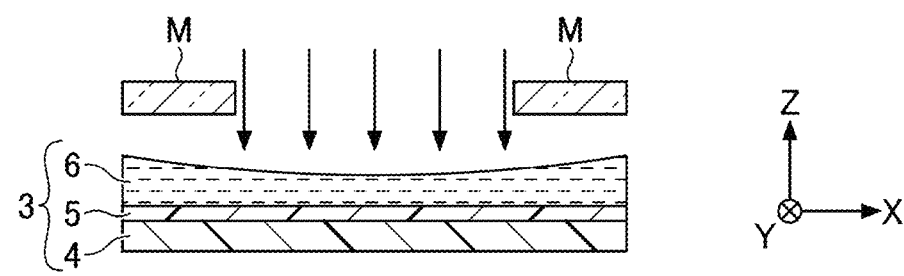
FIG. 10B is a cross-sectional view showing another example of performing dry etching for an optical element.

The distribution control by using the dry etching method is carried out, for example, before the bending process. For example, as shown in FIGS. 10A and 10B, in the plasma etching method, an exposed portion of the liquid crystal layer 6 is etched with plasma of oxygen or the like by using a mask M that covers a part of the liquid crystal layer 6. The mask M is preferably made of glass that has excellent etching resistance and rigidity. A plurality of masks M having different sizes may be sequentially used so that the thickness T3 of the liquid crystal layer 6 changes smoothly.

In the plasma etching method, for example, a reactive ion etching (RIE) apparatus is used. The gas used for generating plasma may further contain a halogen-containing gas such as tetrafluoromethane ($CF_4$) or tetrachloromethane ($CCl_4$). An amount of etching can be controlled by an etching time, a gas flow rate, or the like.

Third Embodiment

Next, an optical element 1 according to a third embodiment and the like will be described. Hereinafter, differences from the first embodiment and the second embodiment will be mainly described. Note that the technique of the present embodiment may be combined with one or more of the techniques of the first embodiment and the technique of the second embodiment.

First, an optical element 1C according to a third reference embodiment will be described with reference to FIGS. 11A to 12C. In FIG. 11C and FIG. 12C, the magnitude of the retardation Rd is expressed in gray scale. As the density becomes closer to black from white, the magnitude of the retardation Rd of the optical element 1C increases.

The optical element 1C according to the third reference embodiment includes a three-dimensional structure 2C and a retardation plate 3C. The retardation plate 3C includes a transparent substrate 4C, an alignment layer 5C, and a liquid crystal layer 6C. The three-dimensional structure 2C and the retardation plate 3C are bonded to each other via, for example, a bonding layer 7C.

In the bending process for the retardation plate 3C, the extension rate at the periphery of the retardation plate 3C is different from the extension rate at the center of the retardation plate 3C. As a result, the thickness of the retardation plate 3C and the thickness of the liquid crystal layer 6C change concentrically. Therefore, the retardation Rd is concentrically shifted and the color tone is concentrically shifted. The extension rate (%) is obtained from the equation "(A1−A2)/A1×100", where the size before bending is denoted by A1 and the size after the bending is denoted by A2.

Figure 11A:
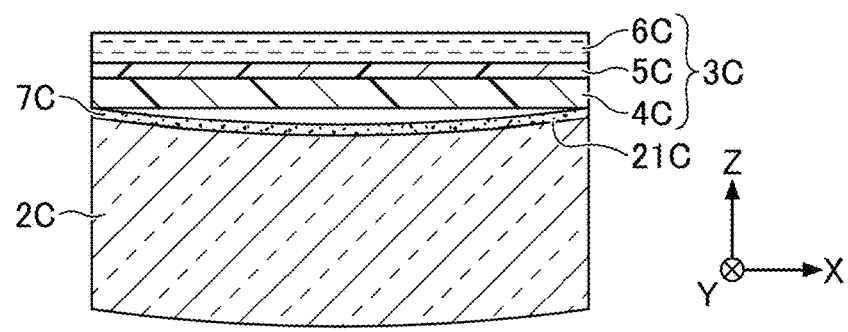
FIG. 11A is a cross-sectional view showing a state before a retardation plate and a three-dimensional structure of an optical element according to a third reference embodiment are bonded.
Figure 11B:
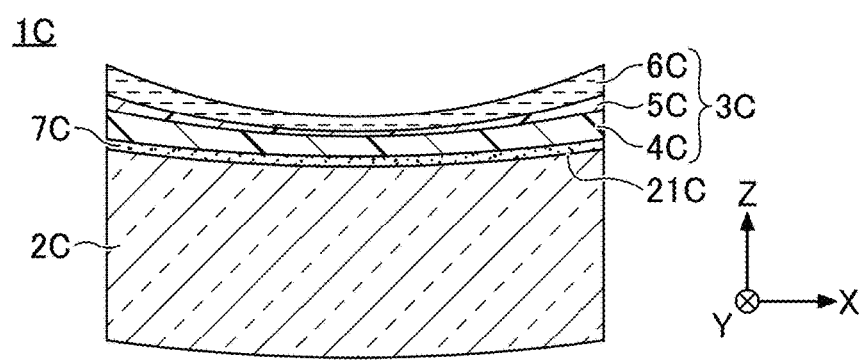
FIG. 11B is a cross-sectional view showing the optical element formed by bonding the retardation plate and the three-dimensional structure shown in FIG. 11A.
Figure 11C:
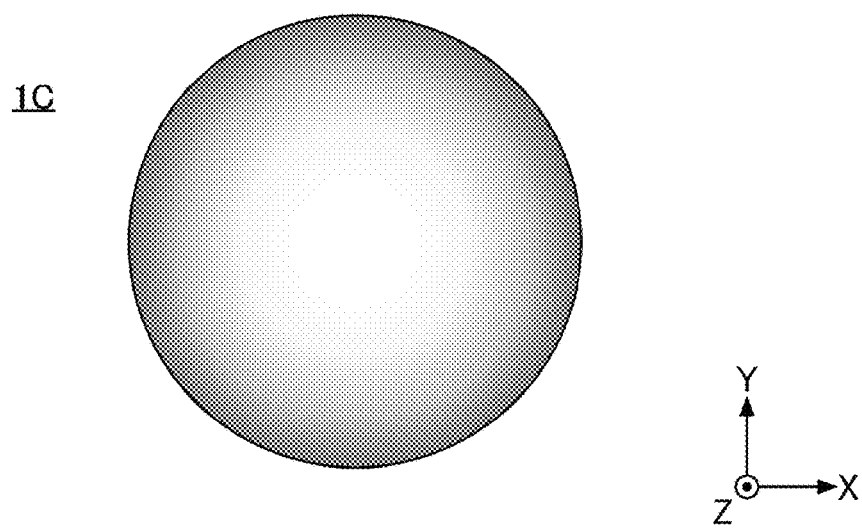
FIG. 11C is a plan view showing a distribution of the retardation Rd of the optical element shown in FIG. 11B.

For example, in the case where the curved surface 21C of the three-dimensional structure 2C is a concave surface as shown in FIG. 11A, when the retardation plate 3C is subjected to the bending process as shown in FIG. 11B, the retardation plate 3C becomes continuously thinner from the periphery toward the center of the retardation plate 3C. This is because the periphery of the retardation plate 3C comes into contact with the curved surface 21C at a timing different from the timing when the center of the retardation plate 3C comes into contact with the curved surface 21C. The center of the retardation plate 3C comes into contact with the curved surface 21C after the periphery comes into contact with the curved surface 21C.

Therefore, as shown in FIG. 11B, the liquid crystal layer 6C becomes continuously thinner from the periphery to the center of the liquid crystal layer 6C. As a result, the retardation Rd continuously decreases from the periphery to the center of the liquid crystal layer 6C as shown in FIG. 11C. Therefore, the color tone is shifted concentrically.

Figure 12A:
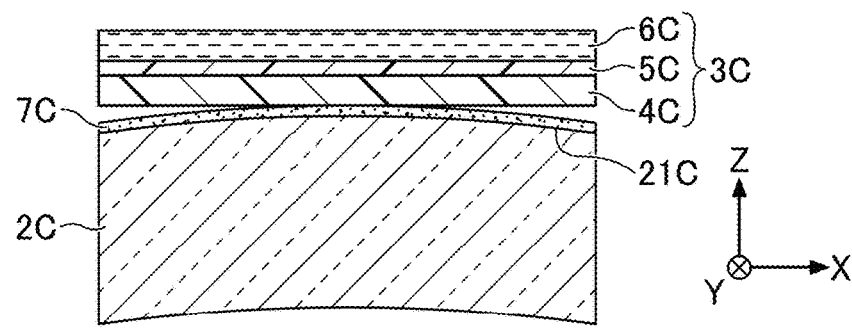
FIG. 12A is a cross-sectional view showing a state before a retardation plate and a three-dimensional structure of an optical element according to a variation of the third reference embodiment are bonded.
Figure 12B:
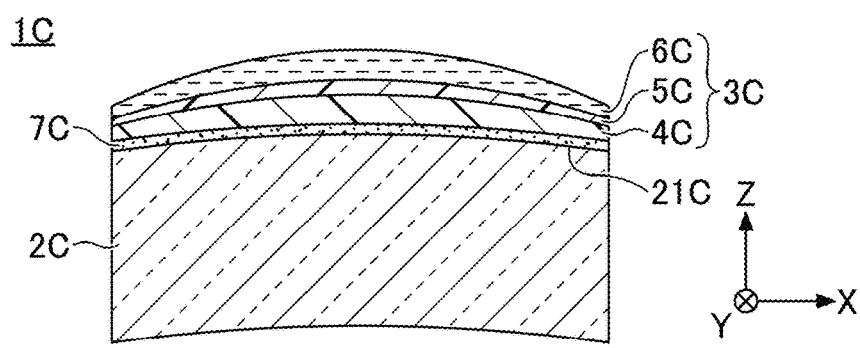
FIG. 12B is a cross-sectional view showing the optical element formed by bonding the retardation plate and the three-dimensional structure shown in FIG. 12A.
Figure 12C:
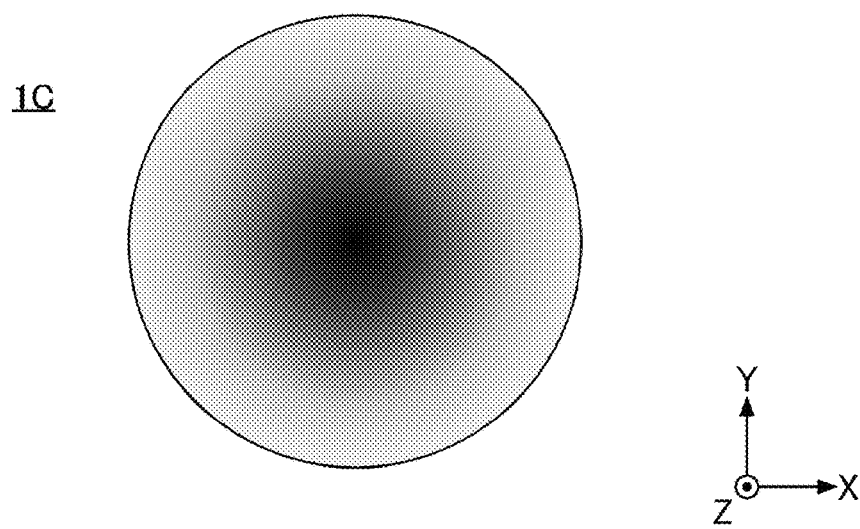
FIG. 12C is a plan view showing a distribution of the retardation Rd of the optical element shown in FIG. 12B.

Further, in the case where the curved surface 21C of the three-dimensional structure 2C is a convex surface as shown in FIG. 12A, when the retardation plate 3C is subjected to the bending process as shown in FIG. 12B, the retardation plate 3C becomes continuously thinner from the center to the periphery of the retardation plate 3C. This is because the periphery of the retardation plate 3C comes into contact with the curved surface 21C at a timing different from the timing when the center of the retardation plate 3C comes into contact with the curved surface 21C. The periphery of the retardation plate 3C comes into contact with the curved surface 21C after the center of the retardation plate 3C comes into contact with the curved surface 21C.

Therefore, as shown in FIG. 12B, the liquid crystal layer 6C becomes thinner continuously from the center to the periphery of the liquid crystal layer 6C. As a result, the retardation Rd continuously decreases from the center to the periphery of the liquid crystal layer 6C as shown in FIG. 12C. Therefore, the color tone is shifted concentrically.

As shown in FIGS. 13A to 14C, the optical element 1 according to the present embodiment includes a three-dimensional structure 2 and a retardation plate 3. The retardation plate 3 includes a transparent substrate 4, an alignment layer 5, and a liquid crystal layer 6. The three-dimensional structure 2 and the retardation plate 3 are bonded to each other via, for example, a bonding layer 7. The alignment layer 5 has a plurality of grooves 51 parallel to each other on a surface in contact with the liquid crystal layer 6.

When the retardation plate 3 is subjected to the bending process, the extension rate of the retardation plate 3 at the periphery of the retardation plate 3 is different from the extension rate at the center of the retardation plate 3. As a result, the thickness T4 of the retardation plate 3 and the thickness T3 of the liquid crystal layer 6 at the center of the retardation plate are different from the thickness T3 and the thickness T4 at the periphery of the retardation plate 3, respectively, after the bending process of the retardation plate 3, in the same manner as in the third reference embodiment.

Figure 13A:
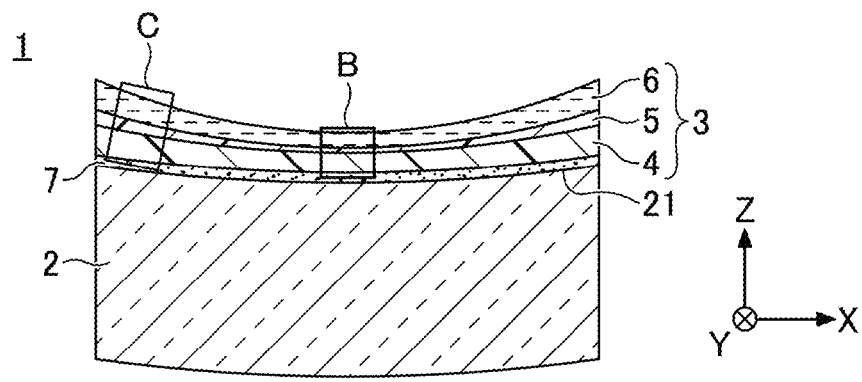
FIG. 13A is a cross-sectional view of an optical element according to a third embodiment.

For example, in the case where the curved surface 21 of the three-dimensional structure 2 is a concave surface as shown in FIG. 13A, when the retardation plate 3 is subjected to the bending process, the thickness T4 of the retardation plate 3 and the thickness T3 of the liquid crystal layer 6 continuously decrease from the periphery to the center of the retardation plate 3 as described in the third reference embodiment.

When the curved surface 21 of the three-dimensional structure 2 is a concave surface, the extension rate of the retardation plate 3 is as follows. The extension rate of the retardation plate 3 at the periphery of the retardation plate 3 is, for example, 0.1%-20%, and preferably 1%-20%. The extension rate of the retardation plate 3 at the center of the retardation plate 3 is, for example, 0.5%-30%, and preferably 1%-20%.

Figure 14A:
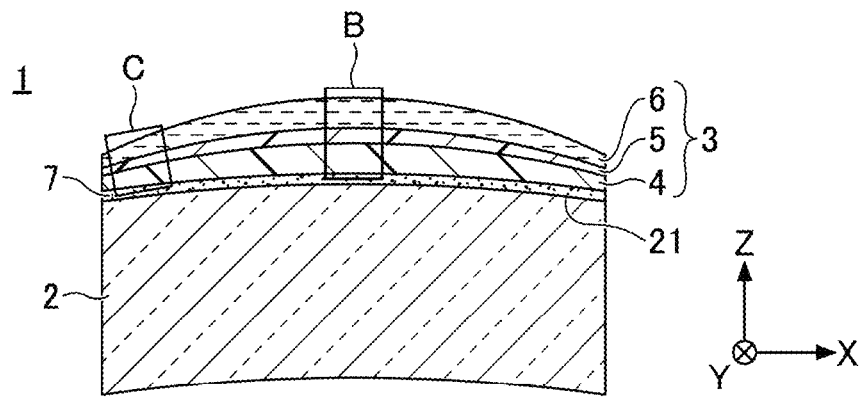
FIG. 14A is a cross-sectional view of an optical element according to a variation of the third embodiment.

In the case where the curved surface 21 of the three-dimensional structure 2 is a convex surface as shown in FIG. 14A, when the retardation plate 3 is subjected to the bending process, the thickness T4 of the retardation plate 3 and the thickness T3 of the liquid crystal layer 6 continuously decrease from the center to the periphery of the retardation plate 3, as described in the third reference embodiment.

When the curved surface 21 of the three-dimensional structure 2 is a convex surface, the extension rate of the retardation plate 3 is as follows. The extension rate of the retardation plate 3 at the center of the retardation plate 3 is, for example, 0.1%-20%, and preferably 1%-20%. The extension rate of the retardation plate 3 at the periphery of the retardation plate 3 is, for example, 0.5%-30%, and preferably 1%-20%.

These tendencies are also found when there is anisotropy in the extension of the retardation plate 3 in the X-axis direction and the Y-axis direction as in the above-described second embodiment. For example, on the second virtual line L2 in FIG. 9, the thickness T4 of the retardation plate 3 and the thickness T3 of the liquid crystal layer 6 continuously decrease or increase from the periphery of the retardation plate 3 toward the center thereof. The same tendency is found on the first virtual line L1 in FIG. 9. This tendency is particularly remarkable on the second virtual line L2 in FIG. 9.

Therefore, in the optical element 1 of the present embodiment and the like, the depth D of the groove 51 at the portion where the thickness T4 of the retardation plate 3 is the thinnest is deeper than the depth D of the groove 51 at the portion where the thickness T4 of the retardation plate 3 is the thickest. The depth D of the groove 51 is adjusted by, for example, an concave-convex pattern of a mold used in an imprint method. The depth D of the groove 51 can also be adjusted by partially ashing the surface of the alignment layer 5.

As the depth D of the groove 51 is deeper, the alignment restricting force for the liquid crystal molecules of the liquid crystal layer 6 is greater and Δn is greater. The increase in the retardation Rd due to the increase in Δn can complement the decrease in the retardation Rd due to the decrease in d, and the variation in the retardation Rd can be suppressed.

Figure 13B:
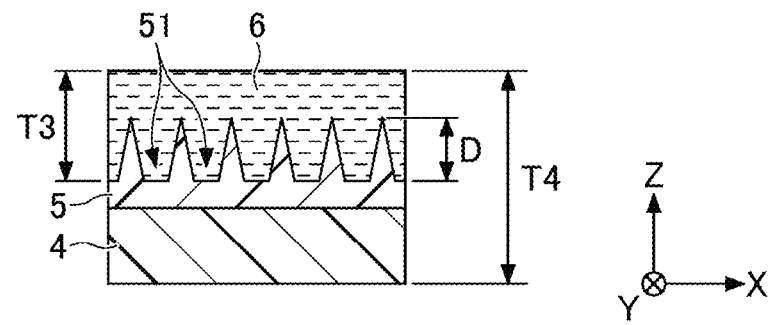
FIG. 13B is an enlarged cross-sectional view of a region B in FIG. 13A.
Figure 13C:
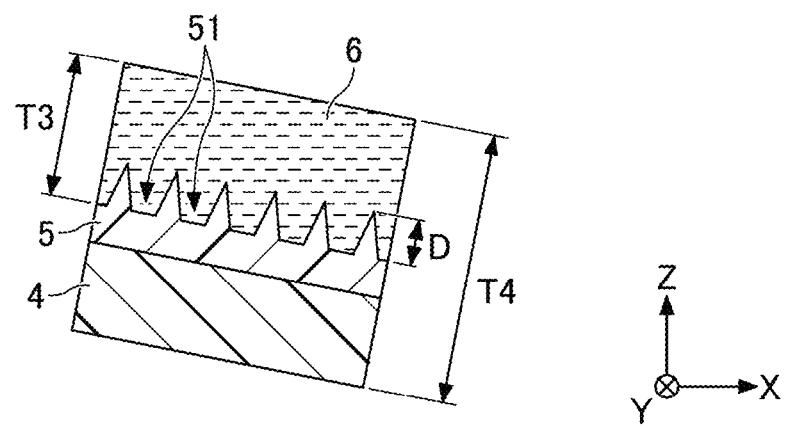
FIG. 13C is an enlarged cross-sectional view of a region C in FIG. 13A.

For example, when the curved surface 21 of the three-dimensional structure 2 is a concave surface as shown in FIG. 13A, the depth D of the groove 51 at the center of the retardation plate 3 is deeper than the depth D of the groove 51 at the periphery of the retardation plate 3 which is apparent when FIG. 13B is compared with FIG. 13C. The depth D of the groove 51 increases continuously or stepwise from the periphery to the center of the retardation plate 3. Thus, the concentric shift of the retardation Rd can be suppressed, and thereby the concentric shift of the color tone can be suppressed.

Figure 14B:
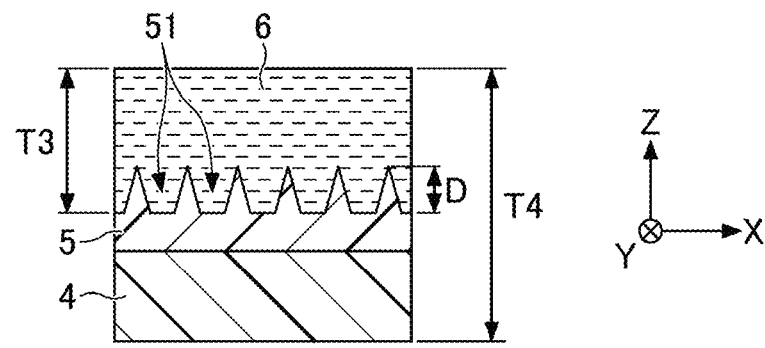
FIG. 14B is an enlarged cross-sectional view of a region B in FIG. 14A.
Figure 14C:
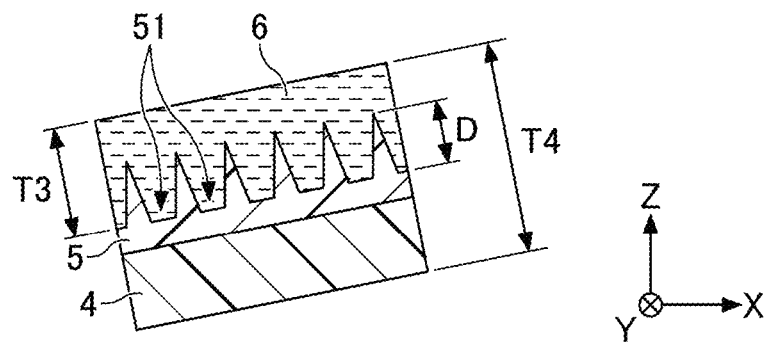
FIG. 14C is an enlarged cross-sectional view of a region C in FIG. 14A.

When the curved surface 21 of the three-dimensional structure 2 is a convex surface as shown in FIG. 14A, the depth D of the groove 51 at the periphery of the retardation plate 3 is deeper than the depth D of the groove 51 at the center of the retardation plate 3 as is apparent from comparison between FIG. 14B and FIG. 14C. The depth D of the groove 51 increases continuously or stepwise from the center to the periphery of the retardation plate 3. Therefore, it is possible to suppress the concentric shift of the retardation Rd, and thereby the concentric shift of the color tone can be suppressed.

As described above, the difference between the thickness T4 of the retardation plate 3 at the periphery of the retardation plate 3 and the thickness T4 at the center on the second virtual line L2 in FIG. 9 is greater than that on the first virtual line L1 in FIG. 9, and the difference between the thickness T3 of the liquid crystal layer 6 at the periphery of the liquid crystal layer 6 and the thickness T3 at the center on the second virtual line L2 is greater than that on the first virtual line L1. Therefore, at least on the second virtual line L2, the depth D of the groove 51 at the portion where the thickness T4 of the retardation plate 3 is the thinnest is preferably greater than the depth D of the groove 51 at the portion where the thickness T4 of the retardation plate 3 is the thickest.

EXAMPLES

Hereinafter, experimental data will be described.

Materials

Materials prepared for Examples are as follows:
Monomer 1: dimethylol-tricyclodecane diacrylate, product name "NK Ester A-DCP" by Shin-Nakamura Chemical Co., Ltd.;
Monomer 2: 1,6-hexanediol diacrylate, product name "NK Ester A-HD-N" by Shin-Nakamura Chemical Co., Ltd.;
Monomer 3: triethylene glycol diacrylate, product name "Light Acrylate 4EG-A" by Kyoeisha Chemical Co., Ltd.;
Monomer 4: trimethylolpropane trimethacrylate, by Tokyo Chemical Industry Co., Ltd.;

Monomer 5: urethane acrylate, product name "NK Oligo U-6LPA" by Shin-Nakamura Chemical Co., Ltd.;

Monomer 6: tetrahydrofurfuryl acrylate, by Tokyo Chemical Industry Co., Ltd.;

Liquid crystal 1: product name "LC 242" by BASF Japan Ltd.;

Photopolymerization initiator 1: product name "IRGA-CURE907" by Ciba Specialty Chemicals Ltd.;

Solvent 1: methyl ethyl ketone;

Transparent substrate 1: PMMA film, product name "OXIS FZ-T13-W1-40" by Okura Industrial Co., Ltd. (thickness was 40 µm); and Transparent substrate 2: TAC film, product name "ZRD40SL" by Fujifilm Corporation (thickness was 40 µm).

Photocurable Composition 1

A photocurable composition 1 was prepared by mixing the monomer 2 of 20 g, the monomer 3 of 50 g, the monomer 4 of 30 g, and the photopolymerization initiator 1 of 3.0 g.

Photocurable Composition 2

A photocurable composition 2 was prepared by mixing the monomer 1 of 70 g, the monomer 2 of 10 g, the monomer 5 of 20 g, and the photopolymerization initiator 1 of 3.0 g.

Photocurable Composition 3

A photocurable composition 3 was prepared by mixing the monomer 1 of 50 g, the monomer 5 of 50 g, and the photopolymerization initiator 1 of 3.0 g.

Photocurable Composition 4

A photocurable composition 4 was prepared by mixing the monomer 1 of 20 g, the monomer 2 of 60 g, the monomer 5 of 20 g, and the photopolymerization initiator 1 of 3.0 g.

Liquid Crystal Composition 1

A liquid crystal composition 1 was prepared by mixing the liquid crystal 1 of 100 g and the photopolymerization initiator 1 of 3.0 g, and diluting the obtained mixture with the solvent 1 so that a solid concentration was 25% by mass.

Liquid Crystal Composition 2

A liquid crystal composition 2 was prepared by mixing the liquid crystal 1 of 50 g, the monomer 6 of 50 g, and the photopolymerization initiator 1 of 3.0 g, and diluting the obtained mixture with the solvent 1 so that a solid concentration was 50% by mass.

Mold A

As a mold A, a resin mold, product name "LSP70-140" by Soken Chemical & Engineering Co., Ltd. (groove pitch was 140 nm, and groove depth was 150 nm) was prepared.

Mold B

A mold B was prepared by the following procedure. First, the photocurable composition 2 was interposed between the mold A and a PET film (product name "COSMOSHINE A4300" by Toyobo Co., Ltd. (thickness was 250 µm)), and the photocurable composition 2 was irradiated with ultraviolet rays with an intensity of 1000 mJ/cm$^2$ through the PET film while maintaining a gap therebetween to be 5 µm to cure the photocurable composition 2. Thereafter, the mold A was peeled off to prepare the mold B. Thus, the concave-convex pattern of the mold B was obtained by reversing the concave-convex pattern of the mold A.

Mold C

A mold C was prepared by the following procedure. First, a disk-shaped mask was placed at the center of the mold B, and the mold B was subjected to an ashing process under vacuum with an oxygen supply at 200 ml/min and a power of 400 W. Thereafter, the photocurable composition 1 was interposed between the mold B and a PET film (product name "COSMOSHINE A4300" by Toyobo Co., Ltd. (thickness was 250 µm)), and the photocurable composition 1 was irradiated with ultraviolet rays with an intensity of 1000 mJ/cm$^2$ through the PET film while maintaining a gap therebetween to be 5 µm to cure the photocurable composition 1. Thereafter, the mold B was peeled off to produce the mold C. The concave-convex pattern of the mold C was obtained by reversing the concave-convex pattern of the mold B. The concave-convex pattern of the mold C had a shape of a square having a length of 80 mm per side in a plan view, the depth of the groove at the center thereof was 95 nm, and the depth of the groove at a point separated from the center by 40 mm was 25 nm.

Optical Element

In Examples 1 to 8 below, optical elements were prepared using the above-described materials and the above-described molds. Examples 1, 2, 5, 6, and 8 are practical examples and Examples 3, 4, and 7 are comparative examples.

Example 1

The alignment layer was prepared by the following procedure. First, the photocurable composition 1 was interposed between the mold A and the transparent substrate 1, and the photocurable composition 1 was irradiated with ultraviolet rays with an intensity of 1000 mJ/cm$^2$ through the transparent substrate 1 in a state where a gap therebetween was maintained to be 5 µm to cure the photocurable composition 1. Thereafter, the mold A was peeled off to produce a laminate of the alignment layer 1 and the transparent substrate 1, concave-convex pattern being formed over the alignment layer 1. In the alignment layer 1, the pitch of the grooves was 140 nm and the depth of the grooves was 140 nm.

The liquid crystal layer was prepared by the following procedure. First, the above-described liquid crystal composition 1 was applied to the surface of the alignment layer on which concave-convex pattern was formed by a spin coating method, and dried at 90° C. for 5 minutes, to form a liquid film having a thickness of 1 µm. The liquid film was irradiated with ultraviolet rays with an intensity of 1000 mJ/cm$^2$ under a nitrogen gas atmosphere, to cure the liquid crystal composition 1. Thus, a retardation plate including the liquid crystal layer, the alignment layer, and the transparent substrate was obtained.

The optical element was prepared by the following procedure. First, as the three-dimensional structure, a plano-concave lens (commodity code #45-038 by Edmund Optics Japan Co., Ltd., diameter was 50 mm) was prepared. Next, an optical adhesive (product name "PD-S1" by Panac Co., Ltd., thickness was 25 μm) was stuck to the surface of the transparent substrate of the retardation plate. Thereafter, inside a vacuum chamber, the concave surface of the plano-concave lens was oriented upward, and the retardation plate was disposed above the plano-concave lens. The retardation plate was horizontally disposed with the optical adhesive facing downward. Subsequently, the inside of the vacuum chamber was evacuated, the retardation plate was brought into contact with the concave surface of the plano-concave lens in a state where the retardation plate was heated to 115° C., and the retardation plate was pressed against the concave surface by an air pressure of 300 kPa, so that the retardation plate was subjected to the bending process. Thus, an optical element was obtained.

Example 2

An optical element was prepared in the same manner as in Example 1 except that the photocurable composition 2 was used instead of the photocurable composition 1.

Example 3

An optical element was prepared in the same manner as in Example 1 except that a liquid crystal composition 3 (product name "SIR-W044AP" by Osaka Organic Chemical Industry Ltd.) was used instead of the liquid crystal composition 1 and that the thickness of the liquid crystal layer was 1 μm.

Example 4

An optical element was prepared in the same manner as in Example 1 except that the photocurable composition 3 was used instead of the photocurable composition 1.

Example 5

An optical element was prepared in the same manner as in Example 4 except that the transparent substrate 2 was used instead of the transparent substrate 1 and that the retardation plate was heated to 145° C.

Example 6

An optical element was prepared in the same manner as in Example 1 except that the photocurable composition 4 was used instead of the photocurable composition 1.

Example 7

An optical element was prepared in the same manner as in Example 1 except that the transparent substrate 2 was used instead of the transparent substrate 1, that the liquid crystal composition 2 was used instead of the liquid crystal composition 1, that the thickness of the liquid crystal layer was set to 2 μm, and that the retardation plate was heated to 145° C.

Example 8

An optical element was prepared in the same manner as in Example 1 except that the mold C was used instead of the mold A to prepare the alignment layer.

Glass-Transition Temperature

The glass-transition temperatures of the transparent substrate and the retardation plate were measured by the TMA according to the following procedure. A sample having a length of 8 mm and a width of 5 mm was mounted to a TMA apparatus, the tensile force in the length direction was maintained at 0.2 N, the temperature was increased from 30° C. to 200° C. at a rate of 5° C./min, and the dimensional change of the sample was measured. The glass-transition temperature was obtained as an intersection point of an extension line of a straight-line portion of the TMA curve on the high temperature side and an extension line of a straight-line portion of the TMA curve on the low temperature side with reference to an inflection point at which the extension rate changes. When there were two or more inflection points, the inflection point on the higher temperature side was taken as the glass-transition temperature. The measurement was performed three times, and an arithmetic mean value thereof was determined as the glass-transition temperature. When the glass-transition temperature Tgne was measured, the longitudinal direction of the sample was parallel to the slow axis, and when the glass-transition temperature Tgno was measured, the longitudinal direction of the sample was parallel to the fast axis.

Young's Modulus

The Young's moduli of the transparent substrate and the retardation plate were measured by the TMA according to the following procedure. A sample of a length of 8 mm and a width of 5 mm was mounted to a TMA apparatus, the tensile force in the length direction was increased from 0.02 N to 1 N at a rate of 0.01 N/min, and the dimensional change of the sample was measured. When the transparent substrate was PMMA, the temperature of the sample was previously set to 115° C. When the transparent substrate was TAC, the temperature of the sample was previously set to 145° C. The Young's modulus was calculated in a region where the strain was 0.0125-0.05. The measurement was performed three times, and an arithmetic average value thereof was determined as the Young's modulus. When the Young's modulus Ene was measured, the longitudinal direction of the sample was parallel to the slow axis, and when the Young's modulus Eno was measured, the longitudinal direction of the sample was parallel to the fast axis.

Evaluation of Optical Element

The optical elements prepared in Examples 1-5 and Example 8 were visually observed to confirm presence or absence of buckling of the retardation plate. Results of the observation are shown in TABLE 1.

TABLE 1

| | Transparent substrate | | | Alignment layer | Liquid crystal layer | Retardation plate | | | | Presence of buckling |
|---|---|---|---|---|---|---|---|---|---|---|
| | Material | Tgf [° C.] | Ef [MPa] | Coating material | Coating material | Ene [MPa] | Eno [MPa] | Ene/Ef | Eno/Ef | |
| Ex. 1 | PMMA | 115 | 19 | Photocurable composition 1 | Liquid crystal composition 1 | 26 | 20 | 1.37 | 1.05 | No |
| Ex. 2 | PMMA | 115 | 19 | Photocurable composition 2 | Liquid crystal composition 1 | 55 | 45 | 2.89 | 2.37 | No |
| Ex. 3 | PMMA | 115 | 19 | Photocurable composition 2 | Liquid crystal composition 3 | 96 | 63 | 5.05 | 3.31 | Yes |
| Ex. 4 | PMMA | 115 | 19 | Photocurable composition 3 | Liquid crystal composition 1 | 112 | 97 | 5.89 | 5.1 | Yes |
| Ex. 5 | TAC | 145 | 44 | Photocurable composition 3 | Liquid crystal composition 1 | 82 | 68 | 1.86 | 1.55 | No |
| Ex. 8 | PMMA | 115 | 19 | Photocurable composition 1 | Liquid crystal composition 1 | 25 | 21 | 1.31 | 1.1 | No |

As is clear from TABLE 1, in Examples 1, 2, 5, and 8, Ene/Ef and Eno/Ef were 5.00 or less, and thus buckling did not occur. On the other hand, in Examples 3 and 4, Ene/Ef, Eno/Ef, or both was greater than 5.00, and buckling occurred. A steep change in retardation was observed in the region where buckling occurred.

The retardation Rd of the optical elements prepared in Examples 1 and 5 to 7 was measured. The retardation Rd was measured by using a two-dimensional (2D) birefringence measurement system (WPA-200 by Photonic Lattice, Inc.), placing the retardation plate toward a camera of the measurement system, and collectively measuring the entire effective region (circular region having a diameter of 40 mm) of the retardation plate. Note that Rd is a retardation of light with a wavelength of 543 nm. Results of the measurement are shown in TABLE 2.

TABLE 2

| | Transparent substrate Material | Alignment layer Coating material | Liquid crystal layer Coating material | Retardation plate | | |
|---|---|---|---|---|---|---|
| | | | | Tgne [° C.] | Tgno [° C.] | Rne/Rno |
| Ex. 1 | PMMA | Photocurable composition 1 | Liquid crystal composition 1 | 145 | 130 | 1.01 |
| Ex. 6 | PMMA | Photocurable composition 4 | Liquid crystal composition 1 | 144 | 135 | 1.02 |
| Ex. 5 | TAC | Photocurable composition 1 | Liquid crystal composition 1 | 150 | 145 | 1.02 |
| Ex. 7 | TAC | Photocurable composition 1 | Liquid crystal composition 2 | 145 | 145 | 1.07 |

In TABLE 2, Rne is a ratio of the maximum value of Rd to the minimum value of Rd (maximum/minimum) on the first virtual line L1 shown in FIG. 9, and Rno is a ratio of the maximum value of Rd to the minimum value of Rd (maximum/minimum) on the second virtual line L2 shown in FIG. 9. As can be seen in TABLE 2, a value of a ratio of Rne to Rno (Rne/Rno) is close to 1.00. It means that a difference between Rd at the first point P1 and the second point P2 on the first virtual line L1 and Rd at the third point P3 and the fourth point P4 on the second virtual line L2 is small. When the ratio Rne/Rno was greater than 0.95 and less than 1.05, the distribution of the retardation Rd was determined to be isotropic (concentric).

As is clear from TABLE 2, in Examples 1, 5 and 6, since Tgne was higher than Tgno, the difference in Rd was small. Thus, the ratio Rne/Rno was greater than 0.95 and less than 1.05, and the distribution of Rd was isotropic. On the other hand, in Example 7, since Tgne was the same as Tgno, the difference in Rd was large. Thus, the ratio Rne/Rno was 1.05 or more, and the distribution of Rd was not isotropic (concentric).

The retardation Rd of the optical elements prepared in Examples 1 and 8 was measured using the above-described method. Results of measurements are shown in TABLE 3.

TABLE 3

| | Transparent substrate Material | Alignment layer Mold | Liquid crystal layer Coating material | Retardation plate | | | | | | 2 × Rmax/(Rmax + Rmin) | 2 × Rmin/(Rmax + Rmin) |
|---|---|---|---|---|---|---|---|---|---|---|---|
| | | | | D1 [nm] | D2 [nm] | D3 [nm] | D4 [nm] | Rmax [nm] | Rmin [nm] | | |
| Ex. 8 | PMMA | Mold C | Liquid crystal composition 1 | 83 | 24 | 83 | 23 | 137 | 133 | 1.015 | 0.985 |
| Ex. 1 | PMMA | Mold A | Liquid crystal composition 1 | 113 | 123 | 113 | 122 | 144 | 134 | 1.036 | 0.968 |

In TABLE 3, D1 is the depth of the groove of the alignment layer at the point where the thickness of the retardation plate is the thinnest within the effective region of the retardation plate, and D2 is the depth of the groove of the alignment layer at the point where the thickness of the retardation plate is the thickest within the effective region of the retardation plate. In TABLE 3, D3 is the depth of the groove of the alignment layer at the point where the thickness of the retardation plate is the thinnest on the second virtual line L2 (see FIG. 9), and D4 is the depth of the groove of the alignment layer at the point where the thickness of the retardation plate is the thickest on the second virtual line L2.

In TABLE 3, R max is the maximum value of the retardation Rd in the entire effective region of the retardation plate, and R min is the minimum value of Rd in the entire effective region of the retardation plate. When the value of 2×R max/(R max+R min) was 1.030 or less and the value of 2×R min/(R max+R min) was 0.970 or more, the in-plane variation of Rd was determined to be small.

As is clear from TABLE 3, in Example 8, the depth D1 was greater than the depth D2, and the in-plane variation of Rd was smaller than that in Example 1, in which D1 was less than D2. In Example 8, the depth D3 was greater than the depth D4, and the in-plane variation of Rd was smaller than that in Example 1, in which D3 was less than D4.

As described above, an optical element and a method for manufacturing the same according to the present disclosure have been described. However, the present disclosure is not limited to the above-described embodiments and the like. Various variations, modifications, substitutions, additions, deletions, and combinations may be possible within the scope recited in claims. They of course also naturally fall within the technical scope of the present disclosure.

What is claimed is:

1. An optical element comprising:
a three-dimensional structure having a curved surface; and
a retardation plate bent along the curved surface, wherein
the retardation plate includes a transparent substrate, an alignment layer formed over the transparent substrate, and a liquid crystal layer formed over the alignment layer,
the retardation plate has a slow axis and a fast axis,
the alignment layer has a plurality of grooves parallel to each other on a surface in contact with the liquid crystal layer when viewed from a direction normal to the curved surface of the three-dimensional structure at a center of gravity of the curved surface,
a depth of a groove at a position where a thickness of the retardation plate is thinnest is deeper than a depth of a groove at a position where the thickness of the retardation plate is thickest, and
a glass-transition temperature, Tgne, in a slow axis direction of the retardation plate is higher than a glass-transition temperature, Tgno, in a fast axis direction of the retardation plate.

2. A method for manufacturing the optical element according to claim 1, the method comprising:
bending the retardation plate so as to fit the curved surface of the three-dimensional structure.

3. An optical element comprising:
a three-dimensional structure having a curved surface; and
a retardation plate bent along the curved surface, wherein
the retardation plate includes a transparent substrate, an alignment layer formed over the transparent substrate, and a liquid crystal layer formed over the alignment layer,
the retardation plate has a slow axis and a fast axis,
the alignment layer has a plurality of grooves parallel to each other on a surface in contact with the liquid crystal layer when viewed from a direction normal to the curved surface of the three-dimensional structure at a center of gravity of the curved surface,
a depth of a groove at a position where a thickness of the retardation plate is thinnest is deeper than a depth of a groove at a position where the thickness of the retardation plate is thickest, and
when a temperature of the retardation plate is a glass-transition temperature of the transparent substrate, a ratio of a Young's modulus, Ene, of the retardation plate in a slow axis direction to a Young's modulus, Ef, of the transparent substrate, Ene/Ef, is 0.10 or more and 5.00 or less, and a ratio of a Young's modulus, Eno, of the retardation plate in a fast axis direction to the Young's modulus, Ef, of the transparent substrate, Eno/Ef, is 0.10 or more and 5.00 or less.

4. An optical element comprising:
a three-dimensional structure having a curved surface; and
a retardation plate bent along the curved surface, wherein
the retardation plate includes a transparent substrate, an alignment layer formed over the transparent substrate, and a liquid crystal layer formed over the alignment layer,
the retardation plate has a slow axis and a fast axis,
the alignment layer has a plurality of grooves parallel to each other on a surface in contact with the liquid crystal layer when viewed from a direction normal to the curved surface of the three-dimensional structure at a center of gravity of the curved surface, and
a depth of a groove at a position where a thickness of the retardation plate is thinnest is deeper than a depth of a groove at a position where the thickness of the retardation plate is thickest.

5. The optical element according to claim 4, wherein
on a virtual line passing through a center of gravity of the retardation plate and being parallel to the fast axis, a depth of a groove at a position where a thickness of the retardation plate is thinnest is deeper than a depth of a groove at a position where the thickness of the retardation plate is thickest.

6. The optical element according to claim 4, wherein
the curved surface is a concave surface, and
a depth of the groove at a center of the retardation plate is deeper than a depth of the groove at a periphery of the retardation plate.

7. The optical element according to claim 4, wherein
the curved surface is a convex surface, and
a depth of the groove at a periphery of the retardation plate is deeper than a depth of the groove at a center of the retardation plate.

* * * * *